US011124415B2

(12) United States Patent
Aziz et al.

(10) Patent No.: US 11,124,415 B2
(45) Date of Patent: Sep. 21, 2021

(54) **NITROGEN ENRICHED CARBON DERIVED FROM *ALBIZIA PROCERA* LEAVES**

(71) Applicant: King Fahd University of Petroleum and Minerals, Dhahran (SA)

(72) Inventors: Md. Abdul Aziz, Dhahran (SA); Amar Kamal Mohamedkhair, Dhahran (SA); Zain Hassan Yamani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/582,748

(22) Filed: Sep. 25, 2019

(65) Prior Publication Data
US 2021/0087062 A1 Mar. 25, 2021

(51) Int. Cl.
| | |
|---|---|
| *C01B 32/18* | (2017.01) |
| *C01B 32/348* | (2017.01) |
| *H01G 9/04* | (2006.01) |
| *B82Y 30/00* | (2011.01) |
| *B82Y 40/00* | (2011.01) |
| *H01G 9/042* | (2006.01) |

(52) U.S. Cl.
CPC .......... *C01B 32/18* (2017.08); *C01B 32/348* (2017.08); *H01G 9/04* (2013.01); *B82Y 30/00* (2013.01); *B82Y 40/00* (2013.01); *C01P 2004/24* (2013.01); *H01G 9/042* (2013.01)

(58) Field of Classification Search
CPC ....... C01B 32/05; C01B 32/18; C01B 32/348; H01G 9/04; H01G 9/042; B82Y 30/00; B82Y 40/00
See application file for complete search history.

(56) References Cited

U.S. PATENT DOCUMENTS

2019/0119120 A1  4/2019  El-Kaderi et al.

FOREIGN PATENT DOCUMENTS

| CN | 10425003 | B |   | 5/2016 |   |
|---|---|---|---|---|---|
| CN | 107128893 | A | * | 9/2017 | ............ C01B 32/05 |

OTHER PUBLICATIONS

Wu, et al. ; Hierarchical porous carbon microrods derived from albizia flowers for high performance supercapacitors ; Carbon vol. 147 ; pp. 242-251 ; Jun. 2019 ; Abstract Only ; 2 Pages.

Ahmed, et al. ; Optimization of microwave preparation conditions for activated carbon from Albizia lebbeck seed pods for methylene blue dye adsorption ; Journal of Analytical and Applied Pyrolysis, vol. 105 ; pp. 199-208 ; Jan. 2014 ; 2 Abstract Only ; 2 Pages.

Ahmed, et al. ; Adsorption of cephalexin onto activated carbons from Albizia lebbeck seed pods by microwave-induced KOH and K CO activations ; Chemical Engineering Journal, vols. 211-212 ; pp. 200-207 ; Nov. 15, 2012 ; Abstract Only ; 2 Pages.

(Continued)

*Primary Examiner* — Khanh T Nguyen
(74) *Attorney, Agent, or Firm* — Oblon, McClelland, Maier & Neustadt, L.L.P.

(57) ABSTRACT

A method of preparing porous nitrogen-doped carbon nanosheets by pyrolysis of *Albizia procera* leaves. The nitrogen-doped carbon nanosheets display enhanced electrochemical properties including large surface area and specific capacitance. Electrodes coated with the nitrogen-doped carbon nanosheets are particularly suitable for use in supercapacitors and solar cells.

20 Claims, 16 Drawing Sheets

Scheme I

(56) References Cited

OTHER PUBLICATIONS

Cao, et al. ; Hierarchical Porous Nitrogen-Doped Carbon Nanosheets Derived from Silk for Ultrahigh-Capacity Battery Anodes and Supercapacitors ; American Chemical Society ; Abstract Only ; 2 Pages.

Demir, et al. ; Hierarchical nitrogen-doped porous carbon derived from lecithin for high-performance supercapacitors ; RSC Advances ; Aug. 14, 2017 ; 13 Pages.

Liu, et al. ; Promising Nitrogen-Rich Porous Carbons Derived from One-Step Calcium Chloride Activation of Biomass-Based Waste for High Performance Supercapacitors ; ACS Sustainable Chemistry Engineering ; Dec. 1, 2015 ; 2 Pages.

Bouhamidi, et al. ; Kinetic, thermodynamic, and isosteric heat of dibutyl and diethyl phthalate removal onto activated carbon from Albizzia julibrissin pods ; Particulate Science and Technology, An International Journal, vol. 36, Issue 2 ; pp. 235-243 ; Dec. 18, 2016 ; Abstract Only ; 2 Pages.

Han, et al. ; Herbaceous Biomass Waste-Derived Activated Carbons for Supercapacitors ; Journal of Electrochemical Science and Technology 9(2) ; pp. 157-162 ; 2018 ; 6 Pages.

Nabais, et al. ; Development of easy made low cost bindless monolithic electrodes from biomass with controlled properties to be used as electrochemical capacitors ; Bioresource Technology 102 ; pp. 2781-2787 ; Nov. 25, 2010 ; 7 Pages.

Subramanian, et al. ; Supercapacitors from Activated Carbon Derived from Banana Fibers ; J. Phys. Chem. C 111 ; pp. 7527-7531 ; 2007 ; 5 Pages.

Chen, et al. ; Synthesis of Nitrogen-Doped Porous Carbon Nanofibers as an Efficient Electrode Material for Supercapacitors ; ACS Nano, vol. 6, No. 8 ; 2012 ; pp. 7092-7102 ; 11 Pages.

Zhang, et al. ; One pot synthesis of nitrogen-doped hierarchical porous carbon derived from phenolic formaldehyde resin with sodium citrate as activation agent for supercapacitors ; Journal of Materials Science: Materials in Electronics 29 ; pp. 4639-4648 ; Dec. 13, 2017 ; 10 Pages.

Sun, et al. ; Nitrogen-Doped High Surface Area Carbon as Efficient Electrode Material for Supercapacitors ; Nano: Brief Reports and Reviews, vol. 11, No. 7 ; Apr. 26, 2016 ; 11 pgaes.

Zou, et al. ; Hierarchical N- and O-Doped Porous Carbon Composites for High-Performance Supercapacitors ; Journal of Nanomaterials. vol. 2018 ; 13 Pages.

Tang, et al. ; Macropore- and Micropore-Dominated Carbon Derived from Poly(vinyl alcohol) and Polyvinylpyrrolidone for Supercapacitor and Capacitive Deionization ; ACS Sustainable Chemistry & Energy 5 ; pp. 11324-11333 ; 2017 ; 10 Pages.

Li, et al. ; Studies on preparation and performances of carbon aerogel electrodes for the application of supercapacitor ; Journal of Power Sources 158 ; pp. 784-788 ; 2006 ; 5 Pages.

* cited by examiner

Scheme I ic # NITROGEN ENRICHED CARBON DERIVED FROM ALBIZIA PROCERA LEAVES

STATEMENT OF FUNDING ACKNOWLEDGEMENT

This project was funded by the Center of Research Excellence in Nanotechnology, and the physics department, at King Fahd University of Petroleum and Minerals (KFUPM) through research funds to phys-701_172/181.

FIELD OF THE INVENTION

The present invention relates to nitrogen doped activated carbon derived from *Albizia procera*, an electrode and a supercapacitor comprising the activated carbon.

DESCRIPTION OF THE RELATED ART

The "background" description provided herein is for the purpose of generally presenting the context of the disclosure. All references cited herein are incorporated by reference. Work of the presently named inventors, to the extent it is described in this background section, as well as aspects of the description which may not otherwise qualify as prior art at the time of filing, are neither expressly or impliedly admitted as prior art against the present disclosure.

The combination fossil fuel depletion and concerns about the environmental impact of carbon dioxide emissions has led to an intensive effort to harvest energy from environmental resources such as sun light, wind, tidal waves, and geothermal [Fisher, A. C. "Resource and environmental economics" (1981) *CUP Archive*] Many of the environmental resources are available for generating electricity during part of the day. Thus, an efficient use of the generated electricity is significantly impacted by the energy infrastructure that includes electricity storage and distribution. As a result, many efforts are focused on the development of a cost effective, environmentally friendly, and high-performance electricity storage systems, in particular supercapacitors (SCs) [Wang et al. "A review of electrode materials for electrochemical supercapacitors" *Chemical Society Reviews* (2012) 41, 797-828: and Beguin et al. "Carbons for electrochemical energy storage and conversion systems" Crc Press (2009).

Electric charges are stored in supercapacitors at the electrolyte/electrode interface through electrostatic force resulting from special properties. Supercapacitors have similarities to both batteries and conventional capacitors [Bandaru et al. "Charge transfer and storage in nanostructures" *Materials Science and Engineering: R: Reports.* (2015) 96, 1-69; Richey et al. "Ionic liquid dynamics in nanoporous carbon nanofibers in supercapacitors measured with in operando infrared spectroelectrochemistry" *The Journal of Physical Chemistry C.* (2014) 118, 21846-21855; Pandolfo et al. "Carbon properties and their role in supercapacitors" *Journal of power sources* (2006) 157, 11-27]. They have several advantages over batteries including high capacity to store energy, and rapid charging and discharging [Lu et al. "Supercapacitor electrodes with high-energy and power densities prepared from monolithic NiO/Ni nanocomposites" *Angewandte Chemie International Edition* (2011) 50, 6847-6850; Liu et al. "Graphene-based supercapacitor with an ultrahigh energy density" *Nano letters.* (2010) 10, 4863-4868; Kang et al. "Battery materials for ultrafast charging and discharging" *Nature* (2009) 458, 190; Pech, et al. "Ultrahigh-power micrometre-sized supercapacitors based on onion-like carbon" *Nature nanotechnology* (2010) 5, 651]. The performance of a supercapacitor is dependent on the electrode component material. Activated carbon in different forms is commonly used as a supercapacitor electrode due to its low cost, high surface area, high conductivity, good corrosion resistance, and high-temperature stability [Pandolfo et al. "Principles and applications of electrochemical capacitors" *Electrochimica acta.* (2000) 45, 2483-2498: Peng et al. "Carbon nanotube and conducting polymer composites for supercapacitors" *Progress in Natural science* (2008) 18, 777-788; and Zhang et al. "Carbon-based materials as supercapacitor electrodes" *Chemical Society Reviews* (2009) 38, 2520-2531]. The storage mechanism of activated based carbon supercapacitors is predominantly through the electrical double-layer charging mechanism (EDLC). The charges accumulate at the electrolyte and electrode interface, in contrast to pseudocapacitors, which are based on the faradic redox reaction [Subramanian et al. "Supercapacitors from activated carbon derived from banana fibers" *The Journal of Physical Chemistry C* (2007) 111, 7527-7531]. In addition, carbon doped with hetero atoms such as oxygen and nitrogen is known to increase the total capacitance of supercapacitor through both EDLC and faradic redox reactions [Wei et al. "Large scale production of biomass-derived nitrogen-doped porous carbon materials for supercapacitors" *Electrochimica Acta* (2015) 169, 186-194; Chen et al. "Synthesis of nitrogen-doped porous carbon nanofibers as an efficient electrode material for supercapacitors" *ACS nano.* (2012) 6, 7092-7102; Ma et al. "Nitrogen-doped porous carbon derived from biomass waste for high-performance supercapacitor" *Bioresource technology* (2015) 197, 137-142; Zhang et al. "One pot synthesis of nitrogen-doped hierarchical porous carbon derived from phenolic formaldehyde resin with sodium citrate as activation agent for supercapacitors" *Journal of Materials Science: Materials in Electronics* (2018) 29, 4639-4648; Ahmed et al. "Nitrogen doped activated carbon derived from orange peel for supercapacitor application" *Advances in Natural Sciences: Nanoscience and Nanotechnology* (2018) 9, 035008; Sun et al. "Nitrogen-doped high surface area carbon as efficient electrode material for supercapacitors" *Nano.* (2016) 11, 1650076; and Zou et al. "Hierarchical N- and O-Doped Porous Carbon Composites for High-Performance Supercapacitors" *Journal of Nanomaterials.* 2018. In particular, doping carbon with nitrogen enhances surface wettability, which is beneficial for electrolyte ion access to the carbon pores. Moreover, the doping of carbon with nitrogen increases the electronic conductivity as the nitrogen dopant causes a shift in the Fermi level to the valence band in a carbon electrode.

Pristine and heteroatom-doped carbon materials with various morphologies, porosities, and BET surface areas have been prepared by different methods using synthetic and naturally occurring materials for supercapacitor applications. For example, Tang et al. [Macropore-and micropore-dominated carbon derived from poly(vinylalcohol) and polyvinylpyrrolidone for supercapacitor and capacitive deionization. *ACS Sustainable Chemistry & Engineering.* (2017) 5, 11324-11333] developed a macropore/micropore carbon material from polyvinylpyrrolidone and poly(vinylalcohol) for EDLC. Li et al. ["Studies on preparation and performances of carbon aerogel electrodes for the application of supercapacitor" *Journal of Power Sources* (2006) 158, 784-788] synthesized an aerogel carbon derived from the poly-condensation of resorcinol with formaldehyde. For supercapacitor applications, the preparation of nitrogen doped carbon from a carbon precursor and a nitrogen-containing compound has been a preferred route. For example, Zhang et al. prepared nitrogen-doped hierarchical porous carbon using a phenolic formaldehyde resin as a carbon precursor, sodium citrate as an activating agent, and hexamethylenetetramine as a nitrogen source. Another generally accepted strategy is carbonization of nitrogen-enriched polymers such as polyimide, melamine, polyvinyl pyridine, polypyrrole, cyanamide and polyaspartic acid (Chen et al., Sun et al., and Zou et al.).

Recently, development has shifted from expensive precursors and often hazardous inorganic and organic chemicals to abundant natural materials as precursors in the preparation of functional carbon for supercapacitor electrodes. Biomass is an attractive starting material as it can serve as precursor for carbon, nitrogen, and other heteroatoms. It is generally inexpensive and readily available in high quality and large quantity as well as being environmentally friendly. In addition to containing carbon, nitrogen, and oxygen, it contains sulfur and phosphorus as well as metals such as Mn, Fe, Cu, and Zn among others. In spite of the utility of biomass, limited number of studies has been devoted to the production of nitrogen doped carbon. Examples of the biomass materials used include stem bark of *Broussonetia papyrifera*, potato waste residue, shrimp shells, and water hyacinth (*Eichhornia Crassipes*), which have been carbonized to prepare nitrogen-doped carbon [Wei et al.; Ma et al.; Mondal et al. "Naturally nitrogen doped porous carbon derived from waste shrimp shells for high-performance lithium ion batteries and supercapacitors" Microporous and Mesoporous Materials (2017) 246, 72-80; and Liu et al. "Biomass-derived nitrogen self-doped porous carbon as effective metal-free catalysts for oxygen reduction reaction" Nanoscale (2015) 7, 6136-6142].

*Albizia procera* grows widely in the world, including the Middle East, South East Asia, and Australia and produces large amounts of leaves year around. The leaves are lost to the environment but could be used to produce high value products.

The properties of activated carbon including porosity, BET surface area, and morphology of carbon derived from plant materials is highly dependent on activating agent such as, but not limited to alkali metal and alkaline earth metal hydroxide, mineral acids, metal salts, and the like [Abioye et al. "Recent development in the production of activated carbon electrodes from agricultural waste biomass for supercapacitors: a review" *Renewable and sustainable energy reviews* (2015) 52, 1282-1293; Lu et al. "Biomass-derived carbon electrode materials for supercapacitors" *Sustainable Energy & Fuels* (2017) 1, 1265-1281; Ahmed et al. "Supercapacitor performance of activated carbon derived from rotten carrot in aqueous, organic and ionic liquid based electrolytes" *Journal of Saudi Chemical Society* (2018) 22, 993-1002; Shrestha et al. "Nanoarchitectonics of nanoporous carbon materials from natural resource for supercapacitor application" *Journal of Inorganic and Organometallic Polymers and Materials* (2017) 27, 48-56; Zhang et al. "Effect of activation agents on the surface chemical properties and desulphurization performance of activated carbon" *Science China Technological Sciences* (2010) 53, 2515-2520; Xia et al. "Effect of Activating Agent on the Preparation of Bamboo-Based High Surface Area Activated Carbon by Microwave Heating" *High Temperature Materials and Processes* (2016) 35, 535-541; and Grycova et al. "Influence of Activating Reagents on the Porous Structure of Activated Carbon" *Chemical Engineering Transactions* (2018) 70, 1897-1902]. Among the activating agents, $ZnCl_2$ and carbonates are nontoxic. Several types of carbon materials have been prepared by carbonization of biomass with or without an activating agent.

US201901199120A1 discloses a facile synthesis of nanoporous carbon from heterocyclic aromatic organic compounds as a single source of carbon and nitrogen. The method comprises mixing the heterocyclic compound with an activator such as zinc chloride or NaOH and heating the mixture to a temperature in the range of 700-1000° C. US201901199120A1 discloses a method of carbonizing heterocyclic compound, which is not a waste material.

CN104250003B discloses a method of preparing nitrogen-doped carbon nanosheets from plant biomass, i.e., cattail wool fiber. The method comprises forming a hydrogel by hydrothermal carbonization of biomass at a temperature in the range of 160-210° C. for 7-16 h, followed washing and drying the hydrogel to obtain an aerogel, and pyrolysis of the resulting aerogel in the presence of ammonia as a nitrogen source in a furnace at a temperature of 750-850° C. for 0.5-2.5 hours to obtain the nitrogen-doped porous carbon. The CN104250003B method is a two step method utilizing cattail wool fiber and ammonia which is a corrosive chemical.

Wu et al. [Carbon (2019) 147, 242-251] disclose the synthesis of a hierarchical porous carbon microrods in a one step pyrolysis of *Albizia* flowers in the presence of potassium hydroxide as an activating agent at different temperatures. The optimized carbon microrods have a specific surface area of 2757 $m^2/g$ and total pore volume of 1.47 $cm^3/g$ as well as high-self nitrogen doping. Also, the microrods have high specific capacitance of 406 F/g at 0.5 A/g and 335 F/g at 10 A/g in 6 M KOH electrolyte. The carbon microrods disclosed by Wu et al. are prepared by pyrolysis of *Albizia* flowers, which are available only in a limited time during the year, in the presence of costly and corrosive potassium hydroxide.

Ahmed et al. [Chem. Engin J. (2012) 211-212, 200-207; and J. Anal. Appl. Pyrol. (2014) 105, 199-208] disclose a microwave assisted method for the preparation of activated carbon from *Albizia lebbeck* seed pods using potassium hydroxide as an activating agent. The disclosed activated carbon has surface area of 1824.88 $m^2/g$, micropore volume of 0.645 $cm^3/g$ and mesopore volume of 0.137 $cm^3/g$. Also, Ahmed et al. (2012) and (2014) disclose that the activated carbon adsorb cephalexin and methylene blue in an amount of about 137 and 381 mg/g, respectively. Ahmed et al. does not disclose a nitrogen doped activated carbon.

Cao et al. [//pubs.acs.org/doi/full/10.1021/nn506394r] disclose hierarchical porous nitrogen-doped nanosheets obtained by simultaneous activation and pyrolization of silk biomass using potassium hydroxide and potassium carbonate as activators. The porous carbon nanosheets have surface area of 2494 $m^2/g$, hierarchical pore volume of 2.28 $cm^3/g$ and nitrogen content of 4.7%. In addition, they have a reversible lithium storage capacity of 1865 mA/g, capacitance of 242 F/g, and energy density of 102 W h/kg. The disclosed method by Cao et al. utilizes costly and corrosive materials to produce the nitrogen doped carbon.

Demir et al. [RSC Adv. (2007) 7, 42430] disclose the preparation of three-dimensional nitrogen-doped carbon derived from lecithin. The nitrogen doped carbon was obtained by hydrothermal carbonization of lecithin by heating a mixture lecithin and water at 300° C. and pressure of 100 bar for 30 min, followed by treatment with KOH and urea at 90° C. for 10 h, and the resulting powder was calcined. The resulted nitrogen-doped carbon has surface area of 1803 $m^2/g$, specific capacitance of 285 F/g at 0.5 A/g, and energy density of 24.7 W h/kg at a power density of 500 W/kg is 1 M sulfuric acid. Demir et al. disclosed method utilizes costly such as lecithin which is a commodity with many known uses in the pharmaceutical and food industries.

Liu et al. [ACS Sustainble Chem. Engin. (2016) 4 (1) 177-187] disclose the use of calcium chloride as an activating agent in the preparation of porous carbon in one step from sugar cane bagasse in the presence of urea. The method of preparation comprises heating a mixture of urea, calcium chloride, and sugar cane bagasse in a mass ratio of 2:2:1 at 800° C. for 2 hours in nitrogen atmosphere. The prepared carbon has specific capacitance of 323 and 213 F/g at current densities of 1 and 30 A/g, respectively. The resulting activated nitrogen-doped porous carbon has three-dimensional interlinked pores structure. Liu et al. disclosed method utilizes urea as a nitrogen source which is a costly chemical.

Bouhamidi et al. [Particul. Sci. Tech (2018) 36 (2) 235-243] disclose the adsorption of diethyl and dibutyl phthalate by carbon prepared from biomass of *Albizzia julibrissin* pods. The disclosed carbon does not appear to be doped with nitrogen and suitable for use in supercapacitors.

In view of the foregoing, one of the objectives of the present invention is to provide a method of producing nitrogen-doped activated carbon from plant waste materials for use in supercapacitors; in particular, *Albizia procera* leaves and noncorrosive inexpensive chemicals.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

One aspect of the invention is directed to a method of preparing nitrogen doped carbon nanosheets comprises, mixing dried and pulverized *Albizia procera* leaves with an activator in a mass ratio in the range of 0.1-1.0 to form a mixture, and heating the mixture in an inert atmosphere at a temperature in the range 700-1000 C for 2-8 hours.

In one embodiment, the activator is selected from the group consisting of carbon dioxide, an alkali metal hydroxide, a metal salt, and a mineral acid.

In another embodiment, the alkali metal hydroxide is potassium hydroxide or sodium hydroxide.

In another embodiment, the metal salt is potassium bicarbonate, sodium bicarbonate, potassium carbonate, sodium carbonate, zinc chloride, or calcium chloride.

In another embodiment, the mineral acid is phosphoric acid or sulfuric acid.

In a preferred embodiment, the activator is potassium bicarbonate or sodium bicarbonate.

In another embodiment, the weight ratio of pulverized *Albizia procera* leaves to activator is in the range of 0.2-0.8.

In another embodiment, the temperature is in the range of 800-900° C.

In another embodiment, the inert atmosphere is nitrogen or argon.

Another aspect of the invention is directed porous nitrogen doped carbon nanosheets obtained by the method of the invention having a BET surface area in the range of 300-1500 $m^2/g$.

In one embodiment, the porous nitrogen doped carbon nanosheets have an average pore diameter in the range of 10-50 A.

In another embodiment, the BET surface area is in the range 850-950 $m^2/g$

Another aspect of the invention is directed to a modified electrically conductive substrate coated with the nitrogen doped carbon nanosheets of the invention.

In one embodiment, the carbon nanosheets are present on the surface of the substrate in an amount in the range of 0.2-10 $mg/cm^2$.

In another embodiment, the modified electrically conductive substrate of the invention has a specific capacitance in the range of 175-300 F/g at an applied current density of 1 A/g in 1 M sulfuric acid electrolyte.

In another embodiment, the electrically conductive substrate is glassy carbon, graphite, gold, platinum, silver, iron, copper, aluminum, or an electrically conductive polymer.

In another embodiment, the electrically conductive substrate is poly(p-phenylene vinylene), poly(3-alkylthiophenes), polyacetylenes, poly(fluorine)s, polypyrenes, polyazulenes, polynaphthalene, polypyrols, polyanilines, polycarbazoles, polyazepines, polypyrols, polyindol, polythiophenes, poly(3,4-ethylenedioxythiophene, or pol(p-phenylene sulfide).

Another aspect of the invention is directed to a method of making the modified electrically conductive substrate comprises preparing a slurry of the porous nitrogen doped carbon nanosheets in an aqueous organic solvent containing tetrafluoroethylene-perfluoro-3,6-dioxa-4-methyl-7-octene-sulfonic acid copolymer (Nafion®) in an amount in the range of 0.001 wt. % to 0.01 wt. %, sonicating the slurry to form a suspension, depositing the suspension on the surface of an electrically conductive substrate, air drying the deposited suspension on the surface electrically conductive substrate, and repeating the depositing and drying steps until a catalyst loading of 0.2-10 $mg/cm^2$.

In one embodiment, the electrically conductive substrate is glassy carbon, graphite, gold, platinum, silver, iron, copper, aluminum, or an electrically conductive polymer.

In another embodiment, the electrically conductive is poly(p-phenylene vinylene), poly(3-alkylthiophenes), polyacetylenes, poly(fluorine)s, polypyrenes, polyazulenes, polynaphthalene, polypyrols, polyanilines, polycarbazoles, polyazepines, polypyrols, polyindol, polythiophenes, poly (3,4-ethylenedioxythiophene, or pol(p-phenylene sulfide).

In another embodiment, the organic solvent is methanol, ethanol, propanol, isopropanol, acetone, or acetonitrile.

Another aspect of the invention is directed to an electrochemical cell comprises at least one electrode which is the modified electrically conductive substrate of the invention.

In one embodiment, the electrolyte is an aqueous alkali metal hydroxide or a mineral acid at a concentration in the range of 0.1 to 2.0 M.

In another embodiment, the electrolyte is sulfuric acid.

Another aspect of the invention is directed to a supercapacitor comprising the modified electrically conductive substrate of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
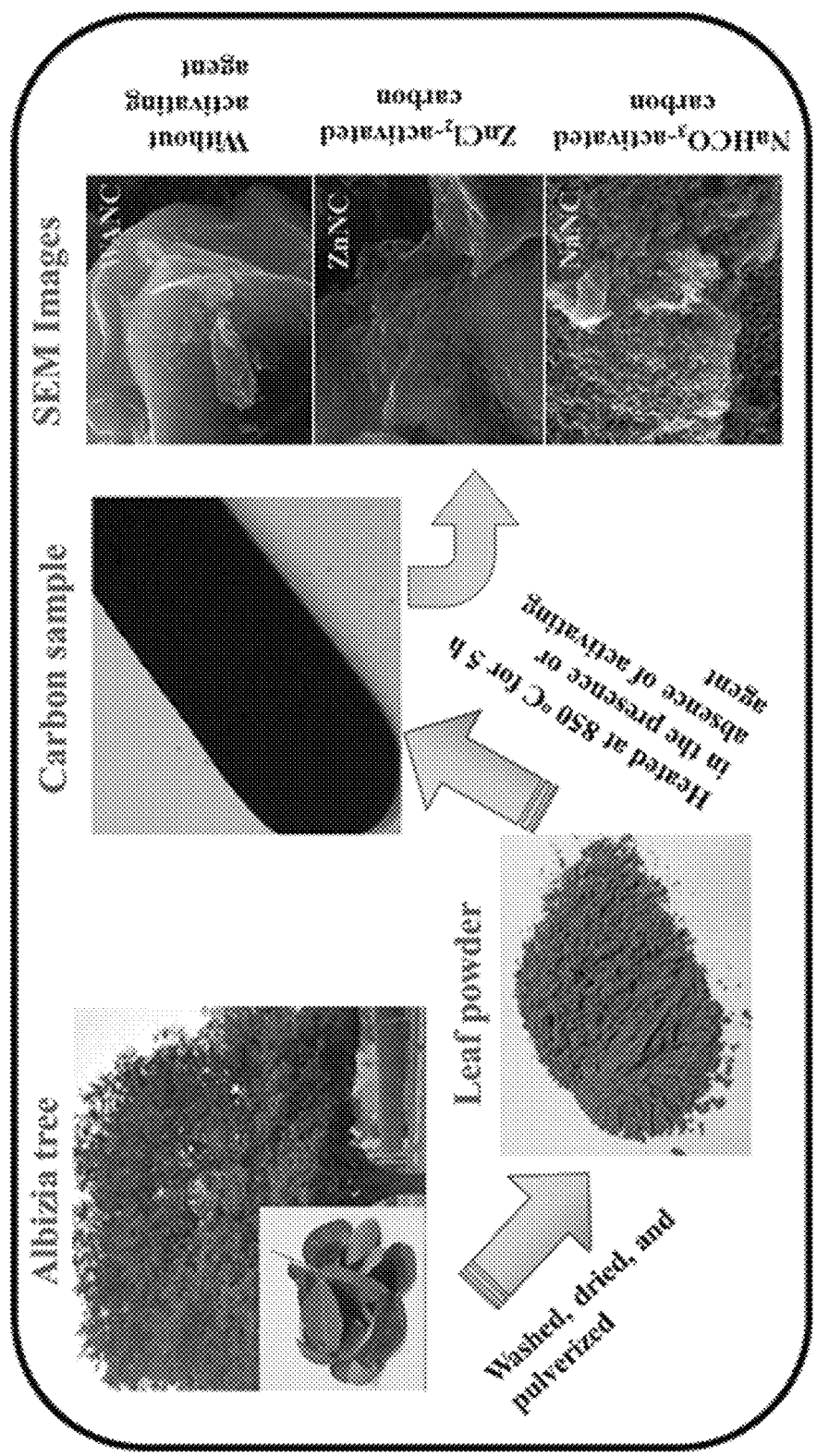
FIG. 1 shows Scheme I for the preparation of carbon samples from *Albizia procera* tree leaves.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

Unless otherwise specified, "a" or "an" means "one or more".

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items.

As used herein in the specification and claims, including as used in the examples and unless otherwise expressly specified, all numbers may be read as if prefaced by the word "substantially", "about" or "approximately," even if the term does not expressly appear. As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8±1.6, ±1.0, ±0.8, ±0.5, ±0.4, ±0.3, ±0.2, or ±0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

According to a first aspect, the present disclosure relates to a method of preparing nitrogen doped carbon nanosheets comprises mixing dried and pulverized plant materials with an activator, and heating the mixture in an inert atmosphere at a temperature in the range of 600-1,200° C., preferably in the range of 700-1,000° C., preferably in the range of 750-950° C., preferably about 850° C. for a time in the range of 1-10 hours, preferably 2-8 hours, preferably 4-6 hours, and preferably about 5 hours. The plant materials may be leaves, branches, wood, flowers, fruits, seeds, husks, strew, roots, and the like.

In some embodiments, the plant material is from the genus *Albizia*, which is a genus of more than 160 species of mostly fast-growing subtropical and tropical trees and shrubs in the subfamily Mimosoideae of the family Fabaceae. The genus is pantropical, occurring in Asia, Africa, Madagascar, America and Australia, but mostly in the Old World tropics. In some locations, some species are considered weeds. They are commonly called silk plants, silk trees, or sirises. In some preferred embodiments, the *Albizia* species is *Albizia procera*, commonly known as white siris. In a particularly preferred embodiment, the plant material is leaves from *Albizia procera*.

In general, the plant material is washed with water and air dried for a time in the range of 12-144 hours, preferably 18-120 hours, preferably 24-96 hours, preferably 36-65, preferably 40-55 hours, preferably about 48 hours. In some embodiments, the air drying time may be more than 144 hours or less than 12 hours depending on the air temperature and humidity. The air dried leaves are further oven dried at a temperature in the range of 70-130° C., preferably 80-120° C., preferably 90-110° C., preferably about 100° C. for a time in the range of 12-144 hours, preferably 18-120 hours, preferably 24-96 hours, preferably 36-65, preferably 40-55 hours, preferably about 48 hours, preferably in the presence of a dessicant. The oven dried leaves are pulverized by any tools available such as but not limited to mortar and pestle, and a homogenizer including kitchen or laboratory blender may be used to grind the dried leaves to obtain a plant material dry fine powder.

To obtain the nitrogen doped carbon nanosheets, the plant material dry fine powder (FP) is mixed with an activator (A) in FP/A ratio in the range of 0.10-1.00, preferably 0.20-0.80, preferably 0.25-0.60, preferably 0.33. Any activator may be utilized in the method of the invention such as, but not limited to carbon dioxide, a metal salt, an alkali or alkaline earth metal hydroxide, and a mineral acid. Examples of metal salts include, but are not limited to sodium carbonate, sodium bicarbonate, potassium carbonate, potassium bicarbonate, and calcium or zinc halide such as calcium chloride, zinc chloride, zinc bromide, calcium iodide, zinc fluoride, and the like. Examples of alkali or alkaline earth metal hydroxides include, but are not limited to potassium hydroxide, sodium hydroxide, calcium hydroxide, and the like. Examples of mineral acids include, but are not limited to, phosphoric acid, sulfuric acid, nitric acid, hydrochloric acid, and the like. The mixture of the plant material dry fine powder and the activator is heated under inert gas such as, but not limited to nitrogen, helium, and argon. The resulting activated carbon may be washed with mineral acid such as but not limited to hydrochloric acid at a concentration in the range of 0.1-2.0 M, preferably 0.5-1.5 M, preferably about 1.0 and deionized water. The washed activated carbon is dried at a temperature in in the range of 50-90° C., preferably 55-75° C., preferably 60-70° C., preferably about 60° C. for a time in the range of 10-96 hours, preferably 15-72 hours, preferably 20-36 hours, preferably about 24 hours.

Another aspect of the invention is directed to a porous nitrogen doped carbon nanoparticles obtained by the method described herein. The size and morphology of the nitrogen doped carbon particles may vary depending on the plant material used, the activator used, and the heating temperature. The nitrogen doped carbon particles may be macroparticles, microparticles, nanoparticles, or combination thereof, having any morphology. Examples of the morphology of the activated carbon nanoparticles include but are not limited to nanosheets, nanospheres, hollow nanospheres, nanorods, and hollow nanorods. In some embodiments, the activated nitrogen doped carbon nanoparticles are nanosheets having a diameter in the range of 10-999 nm, preferably 20-600 nm, preferably 40-400 nm, preferably 60-200 nm. The nitrogen doped activated carbon nanosheets of the invention are highly porous with a BET surface area in the range of 300-2,500 m$^2$/g, preferably 500-2,000 m$^2$/g, preferably 700-1,500 m$^2$/g, preferably 800-1,000 m$^2$/g, preferably 850-950 m$^2$/g. The pore size of the nitrogen doped carbon nanosheets may vary greatly depending on the plant material and the activator used as well as the temperature of the activation and the particle size of powder precursor used. The nitrogen doped carbon nanosheets may have micropores, mesopores, macropores or combinations thereof. In some embodiments, the average pore diameter is in the range of 1-80 Å, preferably 5-60 Å, preferably 10-50 Å, preferably 15-40 Å, preferably 20-30 Å, preferably about 28 Å.

Another aspect of the invention is directed to a modified electrically conductive substrate coated with the nitrogen doped carbon nanosheets of the invention. The substrate is any electrically conductive material. Examples of electrically conductive metals include but not limited to graphite, graphene, copper, aluminum, iron, silver, gold, lead, and zinc. Other conductive substrate includes organic polymers wherein the main polymer chain contains one or more of an aromatic ring, double bond, and combination of aromatic ring and double bond. Examples of conductive polymers include but are not limited to a poly(p-phenylene vinylene), a poly(3-alkylthiophene), a polyacetylene, a poly(fluorine), a polypyrene, a polyazulene, a polynaphthalene, a polypyrol, a polyaniline, a polycarbazole, a polyazepine, a polypyrole, a polyindole, a polythiophene, a poly(3,4-ethylenedioxythiophene), and a poly(p-phenylene sulfide). In some embodiments, the substrate is a polythiophene in the form of a white solid having the chemical formula $(C_4H_2S)_n$. The thiophene rings are linked through the 2- and 5-positions. Substituted poly(alkylthiophene) at the 3- or 4-position tend to be soluble in organic solvents. Polythiophenes become conductive when oxidized. A variety of oxidizing reagents have been used to dope polythiophenes. Iodine and bromine produce highly conductive materials, which are unstable due to slow evaporation of the halogen. Organic acids such as, but not limited to trifluoroacetic acid, propionic acid, and sulfonic acids produce polythiophenes with lower conductivities than iodine, but the resulting polymer has higher environmental stabilities. Oxidative polymerization of thiophenes catalyzed by ferric chloride can result in a polymer doped with the catalyst. Poly(3-octylthiophene) dissolved in toluene can be doped by solutions of ferric chloride hexahydrate dissolved in acetonitrile, and can be cast into films with conductivities reaching 1 S/cm. Other, less common dopants include gold trichloride and trifluoromethanesulfonic acid. The electrical conductivity polythiophenes results from the delocalization of electrons along the polymer backbone. Polythiophenes substrates coated with the carbon nanosheets of the invention are particularly suitable for use in batteries, solar panels, and supercapacitors.

The substrate may have any dimension and shape. For example, the shape of substrate may be a cylindrical rod, a plate, a rectangular sheet, or a block. In some embodiments, the substrate is cylindrical and has a diameter at least 1, 2, 3, 4, 5, 6, 7, 8, 9, or 10 mm and a surface area of at least 0.05, 0.10, 0.15, 0.20, 0.25, 0.30, 0.35, 0.40, 0.45, 0.50 $Cm^2$. In some other embodiments, the substrate is a rectangular sheet of any length and width suitable for use in any application, in particular, for use in supercapacitor. The substrate is modified by coating with a composition comprising the nitrogen doped carbon nanosheets of the invention with a carbon nanosheet loading in the range of 0.1-15 $mg/cm^2$, preferably in the range of 0.2-10 $mg/cm^2$, preferably in the range of 0.3-5 $mg/cm^2$, preferably in the range of 0.5-2 $mg/cm^2$, and preferably about 1.0 $mg/cm^2$ of the surface of the electrode.

In some embodiments, the BET surface area of the modified substrate is in the range of 300-2,500 $m^2/g$, preferably 500-2,000 $m^2/g$, preferably 700-1,500 $m^2/g$, preferably 800-1,000 $m^2/g$, preferably 850-950 $m^2/g$, preferably about 910 $m^2/g$.

In addition to the large electroactive surface area, the modified substrate of the invention has many desirable characteristics that enhance its performance as an electrode in an electrochemical cell or supercapacitor. In some embodiments, the modified electrically conductive substrate of the invention has a specific capacitance in the range of 100-400 F/g, preferably 150-350 F/g, preferably 175-300 F/g, preferably 200-275 F/g, preferably 220-250 F/g, preferably about 231 at an applied current density of 1 A/g in 1 M sulfuric acid electrolyte.

Any electrically conductive substrate may be modified to produce the electrically conductive substrate of the invention. Generally the substrate is modified by a coating comprising the nitrogen doped carbon of the present invention and a binder. The nitrogen doped carbon of the invention and a binder may be wet blended in the presence of a suitable solvent or dry blended using a mortar or other conventionally known mixing equipment. The mixture may then be applied to the surface of the substrate by conventionally known methods. Any electrically conductive substrate may be employed. Preferred electrically conductive substrates include but are not limited to glassy carbon, graphite, graphene, iron, copper, aluminum, gold, silver, platinum, and any electrically conductive polymers mentioned herein above.

Suitable binders known to one of ordinary skill which are chemically stable in the potential window of use of an electrochemical cell or supercapacitor may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoroethylene copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE). Additionally, water soluble binders including branched polyethyleneimine (bPEI), an ethylene-acrylic acid copolymer such as poly 2-acrylamido-2-methylpropane sulfonic acid (PAMPS) and Nafion may be employed as binder. These binders may be used independently, or mixtures may be used.

In some preferred embodiments, the binder is a conductive polymer, also described as electroactive polymer. The conductive polymers comprise inherently conductive polymers (ICP) and conductive plastics. The latter are traditional plastics, such as thermoplastics, that may include conductive fillers, such as powdered metals or carbon (e.g., carbon black or fiber). The conductive polymer may be a biocompatible conductive polymer that isionically conductive and that is mechanically stable over a desired period of time, such as, for example, polypyrrole. In further embodiments the conductive polymer may include, for example, polynaphthalene, polythiophene, Nafion, polyethylene oxide, and polyethyldioxythiophene (PEDOT). Other classes of conductive polymers include polyacetylenes, conductive polypyrrole polystyrene sulfonate, polythiophenes (PT), and polyanilines. Conductive polymers may also include EHPT (poly(3-(2-ethylhexyl)thiophene), ionomers (e.g., Nafion®), poly(3,4 ethylene dioxythiophene) (PEDOT) and PEDOT polystyrene sulfonate (PSS/PEDOT).

In some embodiments, Nafion® is used as a binder which is a trade name for sulfonated tetrafluoroethylene based fluoropolymer-copolymer having the chemical formula $C_7HF_{13}O_5C_2H_4$. This polymer's ionic properties are a result of incorporating perfluorovinyl ether groups terminated with sulfonate groups onto a tetrafluoroethylene (PTFE) backbone. Nafion can be used as a proton conductor for proton exchange membrane (PEM) fuel cells because of its excellent thermal and mechanical stability. It can be produced as both a powder resin and a copolymer. It has various chemical configurations and thus, several chemical names in the IUPAC system. Nafion-H, for example, includes the following systematic names in Chemical Abstract including ethanesulfonyl fluoride, 2-[1-[difluoro-[(trifluoroethenyl)oxy]methyl]-1,2,2,2-tetrafluoroethoxy]-1,1,2,2,-tetrafluoro-, with tetrafluoroethylene; and tetrafluoroethylene-perfluoro-3,6-dioxa-4-methyl-7-octenesulfonic acid copolymer. The molecular weight of Nafion may vary due to differences in processing and solution morphology. A preferred structure for a Nafion unit is:

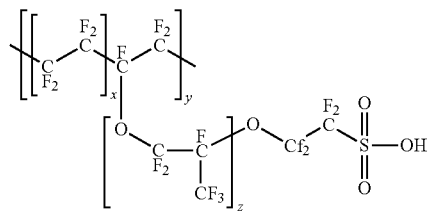

This structure illustrates the variability of the material; for example, the most basic monomer contains chain variation between the ether groups (the z subscript). The molecular weight has been estimated at 105-106 Da. Equivalent weight (EW) and material thickness are used to describe most commercially available Nafion membranes. The EW is the number of grams of dry Nafion per mole of sulfonic acid groups when the material is in the acid form.

In some embodiments of the method, the binder is added to a suspension of the catalyst in aqueous organic solvent in an amount in the range of 0.001-0.010 wt. %, preferably in the range in the range of 0.002-0.008 wt. %, preferably in the range of 0.003-0.006 wt. %, in the range of 0.004-0.005 wt. % of the weight of the catalyst to form a mixture. Any volatile organic solvent miscible with water may be used such as methanol, ethanol, propanol, isopropanol, acetone and the like may be used as a solvent to obtain the mixture. The mixture is deposited on the surface of the substrate and the solvent is allowed to evaporate and the process is repeated until the desired catalyst loading is achieved.

In some embodiments, the method for modifying electrically conductive substrates of invention comprises preparing a slurry of the porous nitrogen doped carbon nanosheets of the invention in an aqueous ethanol containing an electrically conductive binder disclosed herein such as, but not limited to, tetrafluoroethylene-perfluoro-3,6-dioxa-4-methyl-7-octenesulfonic acid copolymer (Nafion®) in an amount in the range of 0.001 wt. % to 0.01 wt. %, sonicating the slurry to form a suspension, depositing the suspension on the surface of an electrically conductive substrate, air drying the deposited suspension on the electrically conductive substrate, and repeating the depositing and drying steps until a catalyst loading of 0.2-10 mg/cm$^2$.

Another aspect of the invention is directed to an electrochemical cell comprising at least one electrically conductive substrate of the invention as an electrode. Typically, an electrochemical cell comprises a working electrode, a counter electrode and an electrolyte, wherein the electrolyte covers the surfaces of the electrodes. In some preferred embodiments, the electrolyte is aqueous acid or alkali or alkaline earth metal hydroxide solution. Any mineral acid may be utilized such as but not limited to hydrochloric acid, sulfuric acid, and nitric acid. In a preferred embodiment sulfuric acid is used as an electrolyte. Any alkali or alkaline earth metal hydroxide such as but not limited to lithium hydroxide, sodium hydroxide, potassium hydroxide, calcium hydroxide, magnesium hydroxide, and the like may be used as an electrolyte. The concentration of the electrolyte in cell is in the range of 0.1-2.0 M, preferably in the range of 0.2-1.8 M, preferably in the range of 0.3-1.5, preferably in the range of 0.4-1.2, and preferably in the range of 0.5-1.0 M. In particularly preferred embodiments, the electrolyte is sulfuric acid at a concentration of about 1.0 M. In some other preferred embodiment, the electrolyte is potassium or sodium hydroxide at a concentration of about 1.0M.

In some other embodiment, the electrolyte is a solid electrolyte. There are several forms of solid electrolytes that include but are not limited to gel electrolyte and solid electrolyte. Gel electrolytes resemble closely liquid electrolytes. In essence, they are liquids in a flexible lattice framework. They are formed by dissolving a salt in a polar liquid and adding polymer network to give the material mechanical stability. Examples of gel electrolytes include, but not limited to sodium acetate or sulfate/polyvinyl alcohol/polyethylene oxide, lithium trifluoromethane sulfonic acid in poly(vinylidene fluoride), poly(1-vinyl-3-propylimidazolium bis(fluorosulfonyl)imide)/1-ethyl-3-methyl imidazolium bis(fluorosulfonyl)imide (EMIFSI), and the like. Dry polymer electrolytes differ from liquid and gel electrolytes in that salt is directly dissolved into the solid medium. Examples of such polymers include, but not limited to polyethers, polyesters, polyimines, polythiols, polysiloxane, and combination thereof. In order to increase the mechanical strength and conductivity of such electrolytes, composites are used in combination with an inert ceramic phase. There are two major classes of such electrolytes: polymer-in-ceramic and ceramic-in-polymer. In solid ceramic electrolytes, ions migrate through the ceramic phase by means of vacancies or interstitials within the lattice. Also, there are glassy-ceramic electrolytes. Another type of solid electrolyte is an organic ionic plastic crystal which is a type of organic salts exhibiting mesophases, i.e., a state of matter intermediate between liquid and solid. In such an electrolyte, mobile ions are orientationally or rotationally disordered while their centers are located at ordered sites in a crystal structure. They have various forms of disorder due to one or more solid-solid phase transitions below the melting point, and therefore, have plastic properties and good mechanical flexibility as well as improved electrodeelectrolyte interfacial contact. In particular, protic organic ionic plastic crystals (POIPCs), which are solid protic organic salts formed by proton transfer from a Brønsted acid to a Brønsted base and in essence are protic ionic liquids in the molten state, have found to be promising solid-state proton conductors for fuel cells. Examples include 1,2,4-triazolium perfluorobutanesulfonate and imidazolium methanesulfonate.

Another aspect of the invention is directed to a supercapacitor comprising the modified electrically conductive substrate of the invention. A supercapacitor, also called an ultracapacitor, is a high-capacity capacitor with a capacitance value much higher than other capacitors with lower voltage limits, that bridges the gap between electrolytic capacitors and rechargeable batteries. Typically, it stores 5 to 500 times, preferably 10-400, preferably 15-300, preferably 20-200, preferably 30-100 more energy per unit volume or mass than electrolytic capacitors, can accept and deliver charge much faster than batteries, and tolerates many more charge and discharge cycles than rechargeable batteries. Supercapacitors are used in applications requiring many rapid charge/discharge cycles, rather than long term compact energy storage system such as, but not limited to automobiles, buses, trains, cranes, and elevators. Smaller units are used as memory backup for static random-access memory (SRAM).

Unlike ordinary capacitors, supercapacitors do not use the conventional solid dielectric material, but rather, they use electrostatic double-layer capacitance and electrochemical pseudocapacitance, both of which contribute to the total capacitance of the capacitor, with a few differences: Electrostatic double-layer capacitors (EDLCs) utilize carbon electrodes or derivatives thereof with much higher electrostatic double-layer capacitance than electrochemical pseudocapacitance, achieving separation of charge in a Helmholtz double layer at the interface between the surface of a conductive electrode and an electrolyte. The separation of charge is on the order of a few Angstroms (0.3-0.8 nm), much smaller than in a conventional capacitor. Electrochemical supercapacitors consist of two electrodes separated by an ion-permeable membrane (separator), and an electrolyte ionically connecting to both electrodes. When the electrodes are polarized by an applied voltage, ions in the electrolyte form electric double layers of opposite polarity to the electrode's polarity. For example, positively polarized electrodes will have a layer of negative ions at the electrode/electrolyte interface along with a charge-balancing layer of positive ions adsorbing onto the negative layer. The opposite is true for the negatively polarized electrode. Additionally, depending on electrode material and surface shape, some ions may permeate the double layer becoming specifically adsorbed ions and contribute with pseudocapacitance to the total capacitance of the supercapacitor. The supper capacitor of the invention comprises at least one electrode which is the modified electrically conductive substrate of invention.

The examples below are intended to further illustrate protocols for the method of dehydrogenating the butane-containing hydrocarbon stream and the method of producing the bimetallic catalyst, and are not intended to limit the scope of the claims.

Example 1

Materials and Methods:

The chemicals used were obtained from Sigma Aldrich. The *Albizia* plant leaves were collected from trees around building 28, at King Fahad University of Petroleum and Minerals, Dhahran-Saudi Arabia. Nitrogen ($N_2$) gas (99.99% purity) was supplied by the SCG gas supplier center, Jubail, Saudi Arabia.

Preparation of Nitrogen-Doped Carbon Materials from *Albizia procera* Leaves:

Scheme I of FIG. 1 outlines the method of preparing the nitrogen doped carbon material of the invention. Typically, collected leaves of *Albizia procera* were washed using tap water and dried for two days under the sun followed by drying in an oven for 48 h at 100° C. Using a kitchen blender, the dried leaves were pulverized to obtain a fine powder. $NaHCO_3$ and $ZnCl_2$ were used as activating agents to obtain carbon with a high surface area. A sample of lea powder (3 g) was mixed with $NaHCO_3$ in a mass ratio of 1:2, and another sample was mixed with $ZnCl_2$ in a mass ratio of 1:4. The leaf powder, with or without activating agent, was heated in a tube furnace at 850° C. under a nitrogen atmosphere for 5 h. The heating and cooling rates were 10° C./min and 5° C./min, respectively. After cooling to room temperature, each carbonized sample was washed by ultrasonication in an aqueous solution of 1 M HCl, and subsequent centrifugation was used to remove all metals and other soluble impurities. Then, each sample was washed with deionized water and filtered using filter paper. As a final step, samples were dried in an oven at 60° C. for 24 h. The dried nitrogen-doped carbon materials prepared without an activating agent and with the activating agents $NaHCO_3$ and $ZnCl_2$ are designated WANC, NaNC, and ZnNC, respectively.

Example 2

Figure 2:
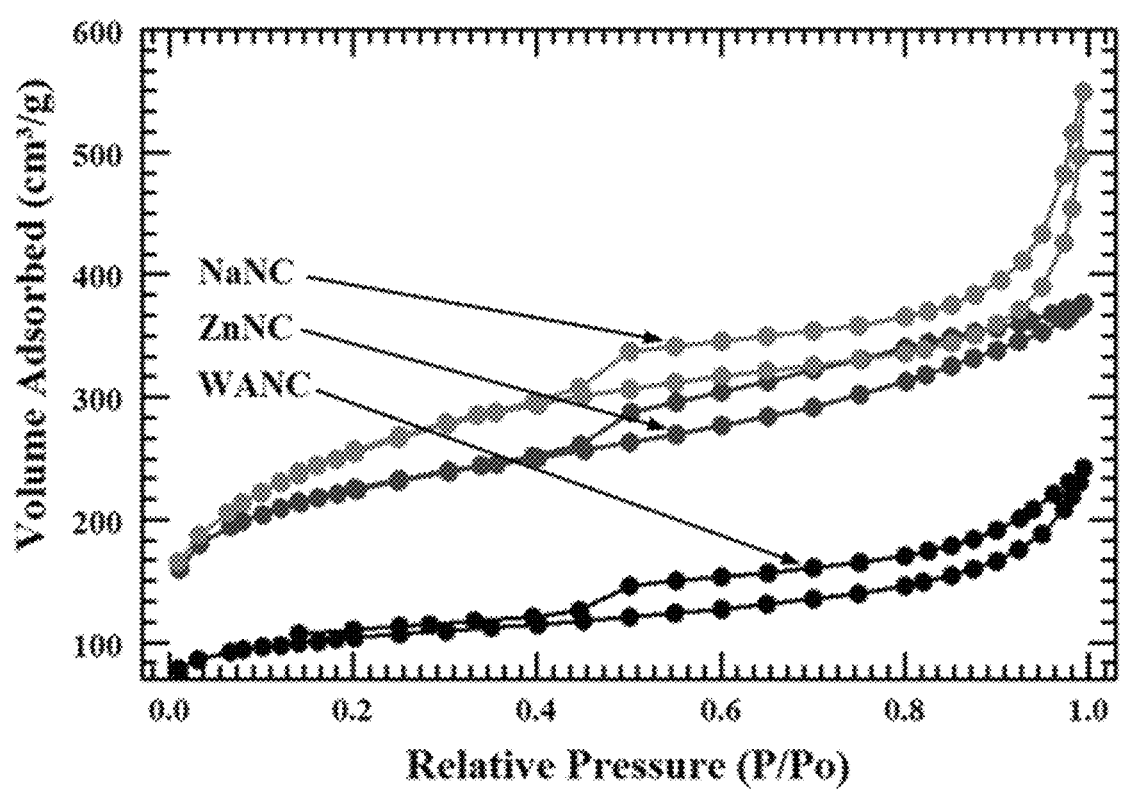
FIG. 2 shows a graph illustrating the nitrogen isothermal analysis WANC, ZnNC, and NaNC activated carbon samples.

BET Surface Area and Pore Size Distribution:

The pore size distribution and the specific surface area were investigated using the nitrogen adsorption-desorption method (BET: Micrometrics, ASAP 2020). The surface properties of a carbon electrode are useful for enhancing supercapacitor performance. $ZnCl_2$ and $NaHCO_3$ were each used to increase the specific area of the carbon electrodes. FIG. 2 shows the nitrogen isothermal analysis for the three prepared carbon samples, WANC, NaNC, and ZnNC, which was performed to determine their pore structures. It can be clearly seen that the three samples belong to type-IV isothermal sorption curves due to the presence of hysteresis loops. In such a curve type, the initial part of the curve is attributed to micropores, and the latter part is due to the existence of mesopores [Sing, K. S. "Reporting physisorption data for gas/solid systems with special reference to the determination of surface area and porosity (Recommendations 1984)" *Pure and applied chemistry* (1985) 57, 603-619—incorporated herein by reference in its entirety]. In addition, the observed significant increase in the NaNC loop size in the relative pressure range ($P/P_0$=0.80-1.00), a Type H3 loop, indicates the presence of macropores [Sun et al. "Nitrogen-doped porous carbons derived from polypyrrole-based aerogels for gas uptake and supercapacitors" *ACS Applied Nano Materials* (2018) 1, 609-616; and Thommes et al. "Physisorption of gases, with special reference to the evaluation of surface area and pore size distribution (IUPAC Technical Report)" *Pure and Applied Chemistry* (2015) 87, 1051-1069—each incorporated herein by reference in their entirety]. Comparing the three results, NaNC shows the highest specific surface area of 910 $m^2$/g, followed by ZnNC and WANC with surface areas of 777 m4 and 322 $m^2$/g, respectively. As a result, NaNC was expected to be the best electrode material for supercapacitor applications among the prepared nitrogen-doped carbon materials. NaNC had nearly three times the sorption volume of WANC, although the average pore width of WANC (~49 Å) was larger than that of NaNC (~28 Å), which indicates NaNC has a higher micro/mesopore ratio than WANC. Table 1 summarizes the BET surface area and average pore width results for the three synthesized carbon samples.

TABLE 1

BET surface area and average pore diameter of the different carbon structures

| Carbon sample | Average pore diameter (Å) | BET surface area $m^2$/g |
|---|---|---|
| WANC | 49 | 322 |
| ZnNC | 15 | 777 |
| NaNC | 28 | 910 |

Example 3

Figure 3:
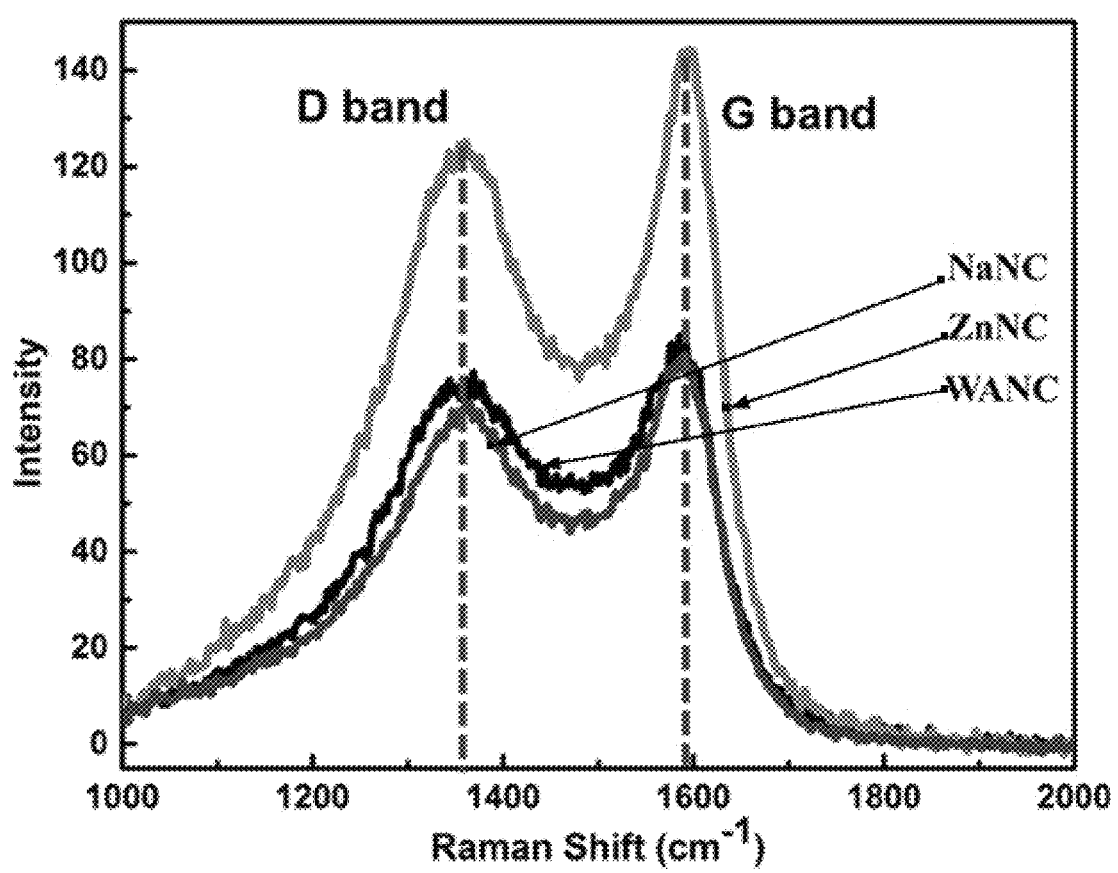
FIG. 3 shows Raman spectra of WANC, ZnNC and NaNC activated carbon samples.

Raman Spectral Analysis:

Raman spectra were recorded on iHR320 Raman spectrometer equipped with CCD detector, HORIBA. Raman spectral analysis is widely used to characterize the structural features of carbonaceous materials [Sadezky et al. "Raman microspectroscopy of soot and related carbonaceous materials: spectral analysis and structural information" *Carbon* (2005) 43, 1731-1742; and Marsh et al. "Activated carbon" Elsevier, (2006)—each incorporated herein by reference in their entirety]. FIG. 3 shows the Raman spectra of the activated carbon samples WANC, NaNC and ZnNC. All samples show the typical Raman spectrum of carbon materials with two prominent peaks observed at ca. 1358 $cm^{-1}$ corresponding to the D-band indicating disorganized carbon and ca. 1600 $cm^{-1}$ corresponding to the G-band indicating graphitic carbon. All samples spectra show troughs with a high signal intensity between the D-band and-G band, which can be classified as the peak D3 band (ca. 1500 $cm^{-1}$), indicating the presence of amorphous carbon. The D band and G band in all samples spectra are broad, which can be attributed to higher disorder in graphite [Jawhari et al. "Raman spectroscopic characterization of some commercially available carbon black materials" *Carbon* (1995) 33, 1561-1565; and Aziz et al. "A Simple and Direct Preparation of a Substrate-Free Interconnected Nanostructured Carbon Electrode from Date Palm Leaflets for Detecting Hydroquinone" *ChemistrySelect* (2017) 2, 4787-4793—each incorporated herein by reference in their entirety].

Example 4

Figure 4:
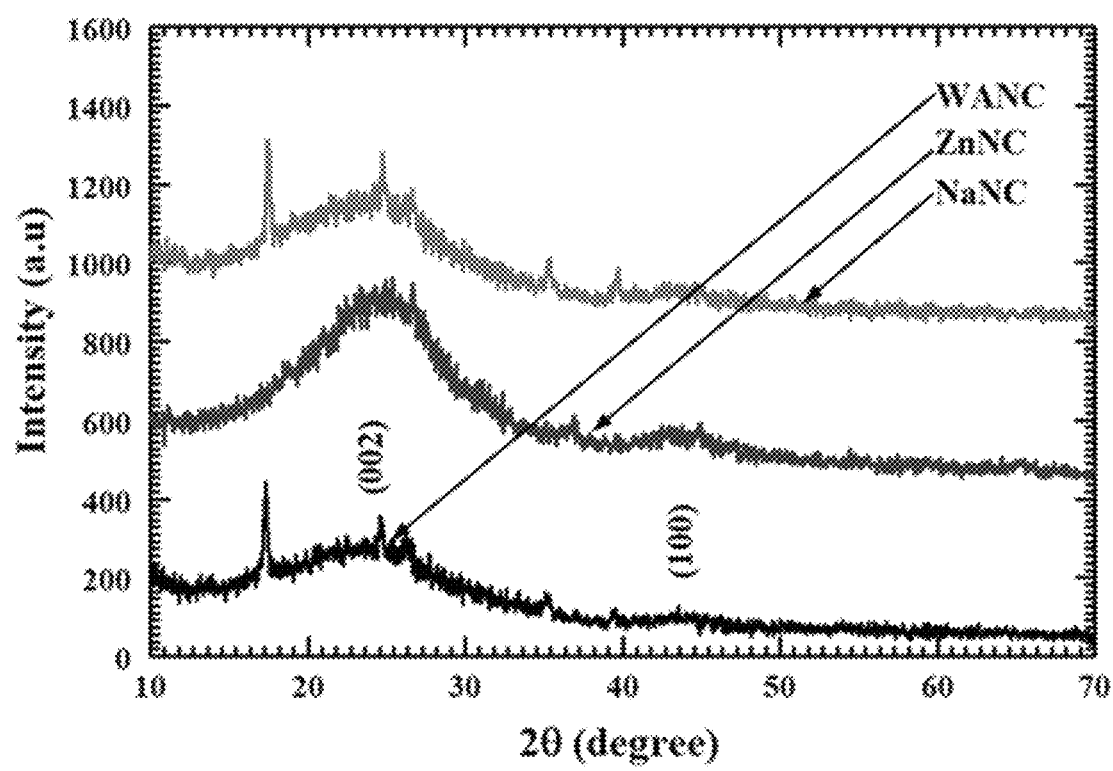
FIG. 4 shows X-ray diffraction patterns of WANC, ZnNC, and NaNC activated carbon samples.

X-Ray Analysis:

X-ray diffraction patterns were obtained on Rigaku Miniflex 600 diffractometer to study the crystallinity of the activated carbon samples. The experiments were conducted in 2θ range from 10° to 70° as shown in FIG. 4. The diffraction patterns of the three samples display broad peaks at 2θ=24.7° and 44.3° that can be attributed to (002) and (100) planes, respectively, indicating the amorphous nature of all the carbon samples [Li et al. "X-ray diffraction patterns of graphite and turbostratic carbon" *Carbon*. 2007, 45, 1686-1695-incorporated herein by reference in its entirety]. The diffraction peaks present in the WANC and NaNC diffraction patterns can be attributed to partial crystallization of the carbon because the positions of the peaks are very similar to the peaks in the diffraction pattern of graphite [Ariharan et al. "Nitrogen doped graphene as potential material for hydrogen storage" *Graphene* (2017) 6, 41—incorporated herein by reference in its entirety].

Example 5

Figure 5A:
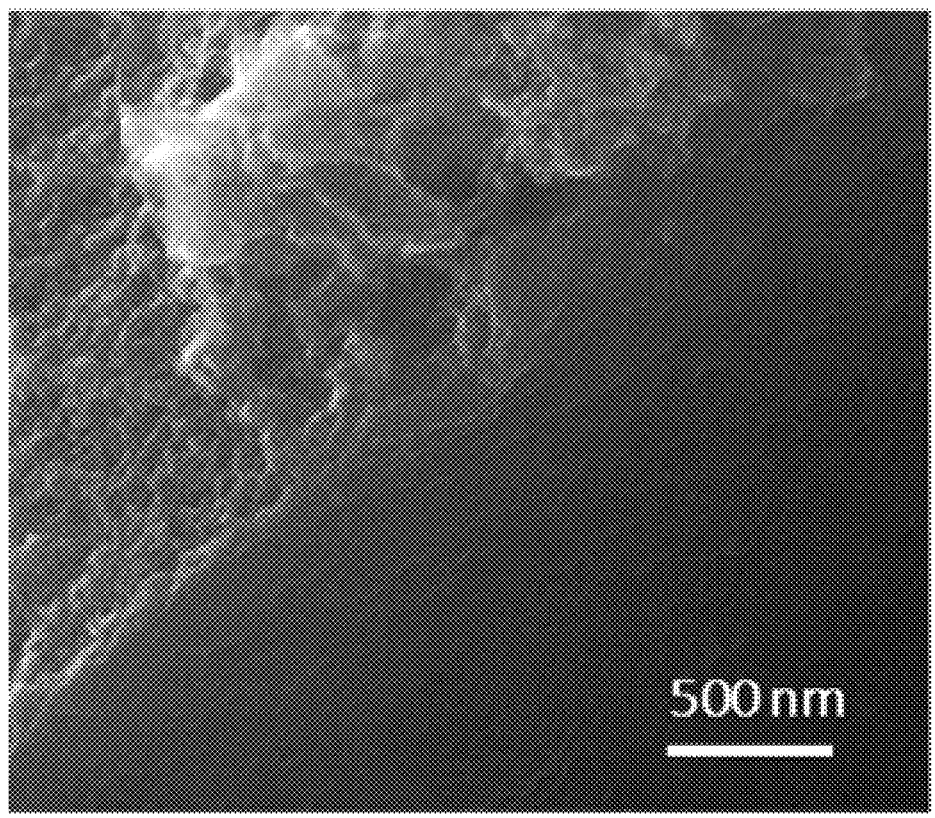
FIG. 5A shows a SEM image of WANC activated carbon.
Figure 5B:
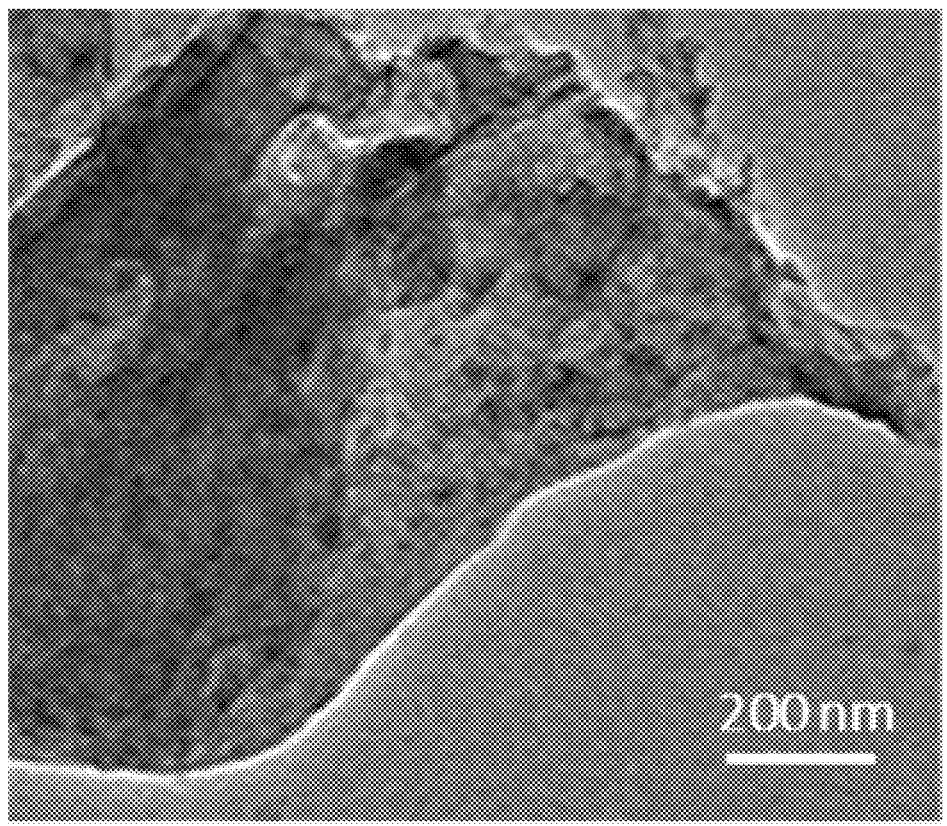
FIG. 5B shows a TEM image of WANC activated carbon.
Figure 5C:
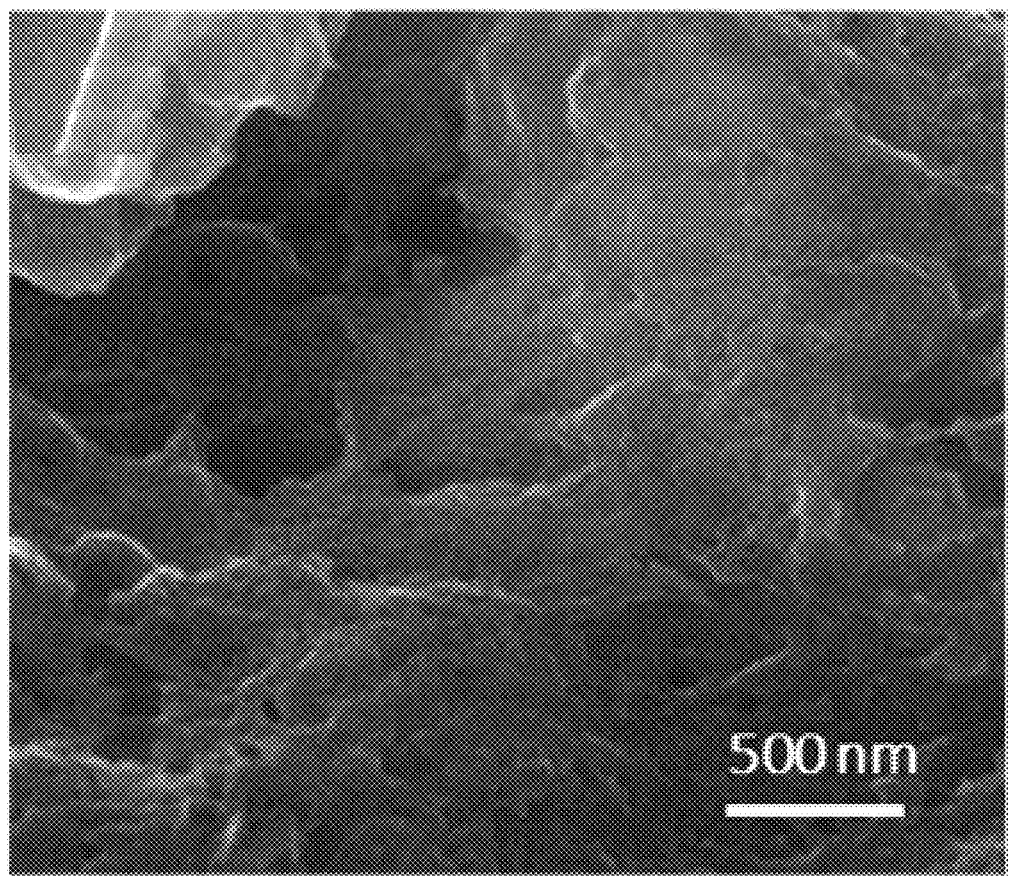
FIG. 5C shows a SEM image of ZnNC activated carbon.
Figure 5D:
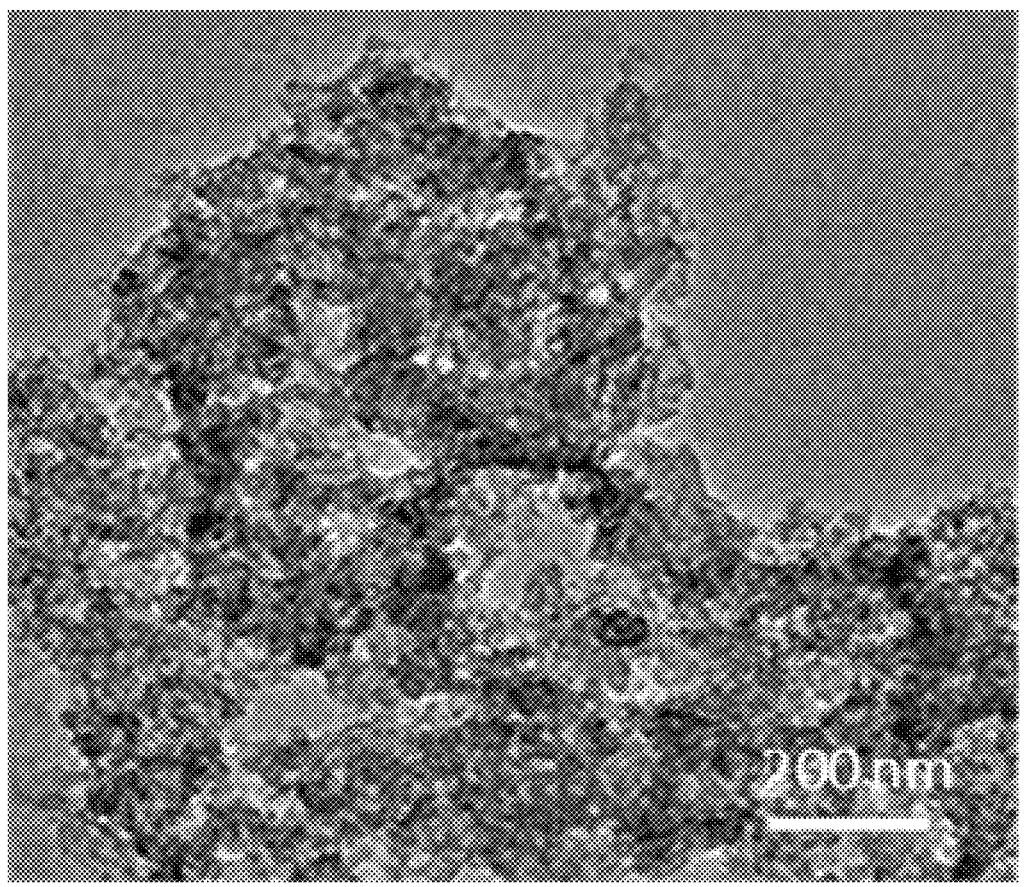
FIG. 5D shows a TEM image of ZnNC activated carbon.
Figure 5E:
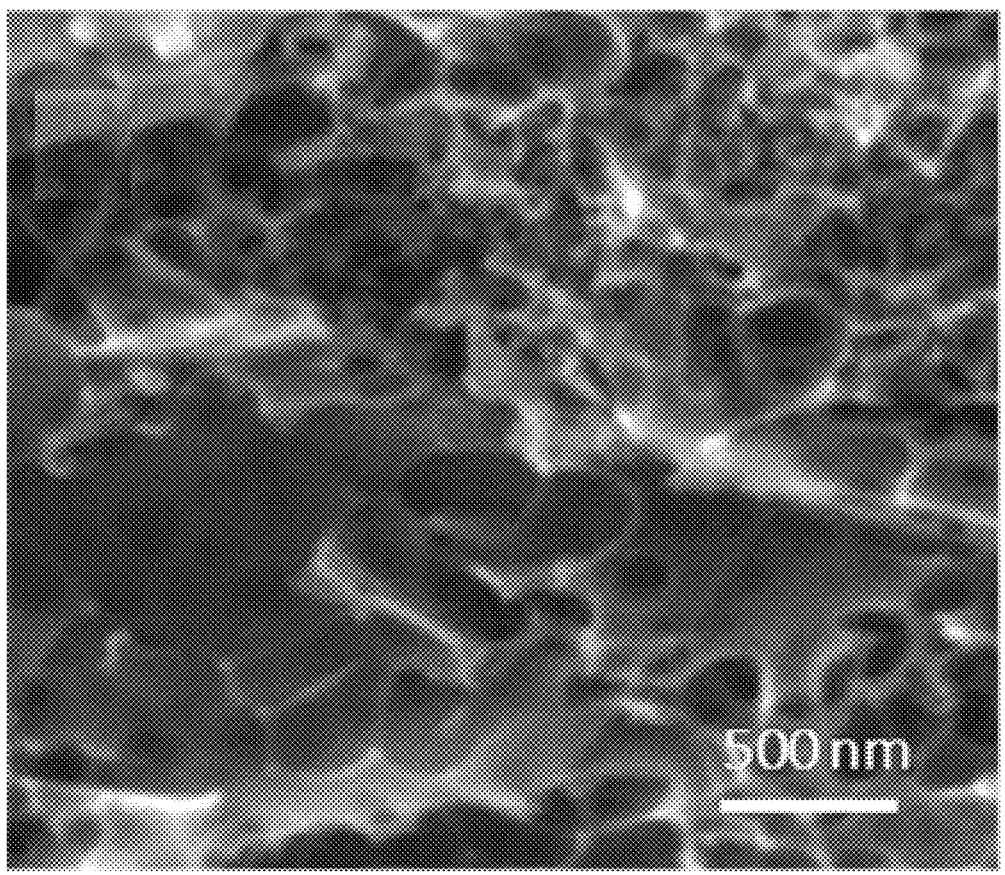
FIG. 5E shows a SEM image of NaNC activated carbon.
Figure 5F:
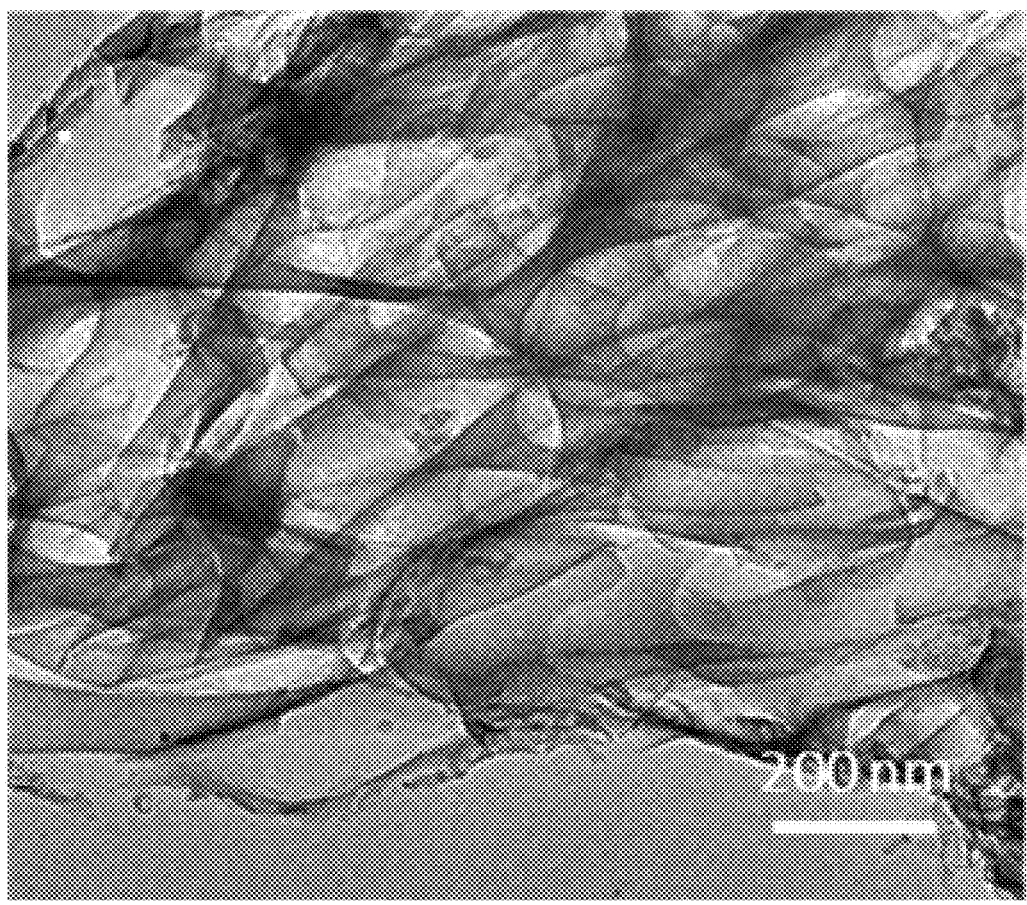
FIG. 5F shows a TEM image of NaNC activated carbon.

Surface Morphology:

The morphologies of the prepared carbon materials were evaluated by both scanning electron microscopy (SEM, Tescan Lyra 3, Czech Republic) and transmission electron microscopy (TEM, JEOL, JEM 2011). The nitrogen-doped carbon prepared with or without activating agent was studied using SEM and TEM to ascertain the surface morphology of the prepared samples. FIGS. 5A, 5C, and 5E show SEM images of WANC, ZnNC, and NaNC SEM respectively, and FIGS. 5B, 5D, and 5F show TEM images of WANC, ZnNC, and NaNC, respectively. The figures mentioned above show the porosity improvement of surface by using an activating agent. FIGS. 5A and 5B demonstrate the bulk nature of WANC, which in turn explains the low surface area of carbon material. Using $ZnCl_2$ as an activation agent increases the carbon surface topography, as shown in FIGS. 5C and 5D by the appearance of some small-sized pores. However, the use of $NaHCO_3$ increases both the size and number of pores on the surface of NaNC carbon significantly, as shown in FIGS. 5E and 5F, and thereby increasing the specific surface area. That is consistent with the BET results discussed above. NaNC is composed of carbon nanosheets with numerous macropores, which correlates with the BET data discussed above.

Example 6

Chemical Composition and Functional Groups:

X-ray photoelectron spectroscopy (XPS: Model: ESCALAB250Xi) was used to examine the chemical composition of the prepared activated carbon materials. FTIR spectra were obtained on Thermo Scientific NICOLET 6700 spectrometer to identify the functional groups present and the microstructure of the activated carbon samples. FTIR spectra of the three samples were recorded in the range of 4000-400 $cm^{-1}$ with 32 scans per spectrum at 4 $cm^{-1}$ resolution. To prepare the sample pellet for FTIR spectral analysis, 0.1 wt. % of the carbon sample was mixed with potassium bromide (KBr) (Thermo Fisher Scientific) powder to prepare KBr pellets. The pellet was formed by transferring the sample powder into a 20 mm die and applying 4-ton pressure using an ATLAS POWER T25 PRESS.

The functional groups and chemical composition of the carbon materials play significant role in supercapacitor applications. As a result, the chemical compositions and functional groups present on the surface of the nitrogen-doped carbon materials were studied using XPS and FTIR techniques.

Figure 6A:
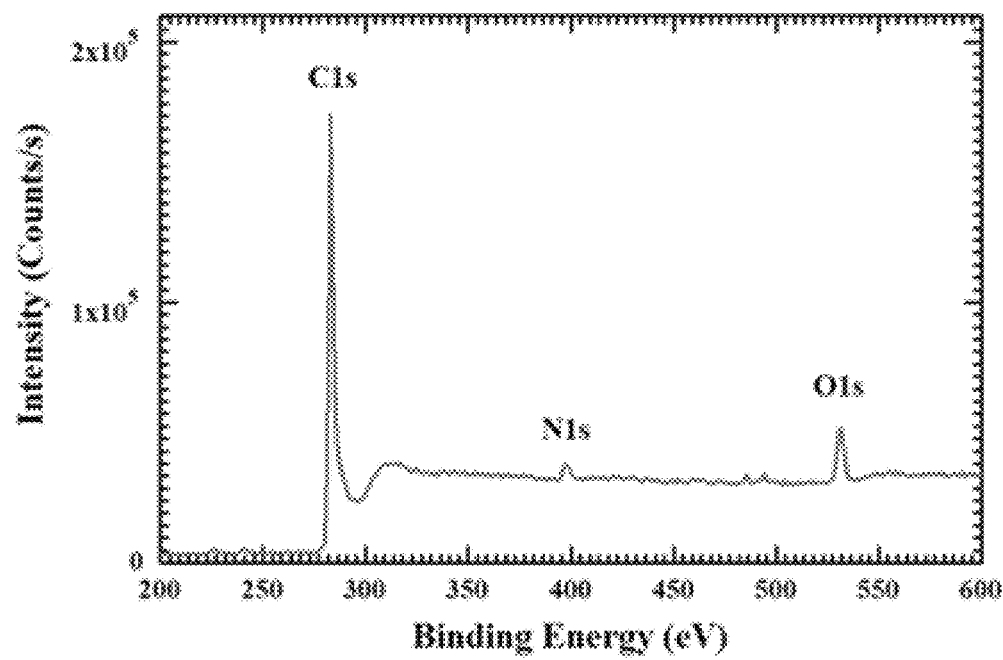
FIG. 6A shows X-ray photoelectron spectra (XPS) of NaNC.

NaNC sample was selected for further examination by XPS because it has the largest BET surface area. FIG. 6A shows the XPS of NaNC displaying three distinct peaks appear at 284.6, 397.5, and 531.8 eV. They are attributed to carbon (C 1s), nitrogen (N 1s), and oxygen (O 1s), respectively. Quantitative elemental analyses of WANC, ZnNC, and NaNC show that the composition percentages are ~90% C 1s, ~5.5% O 1s, ~3% N 1s, and ~1.5% other impurities.

Figure 6B:
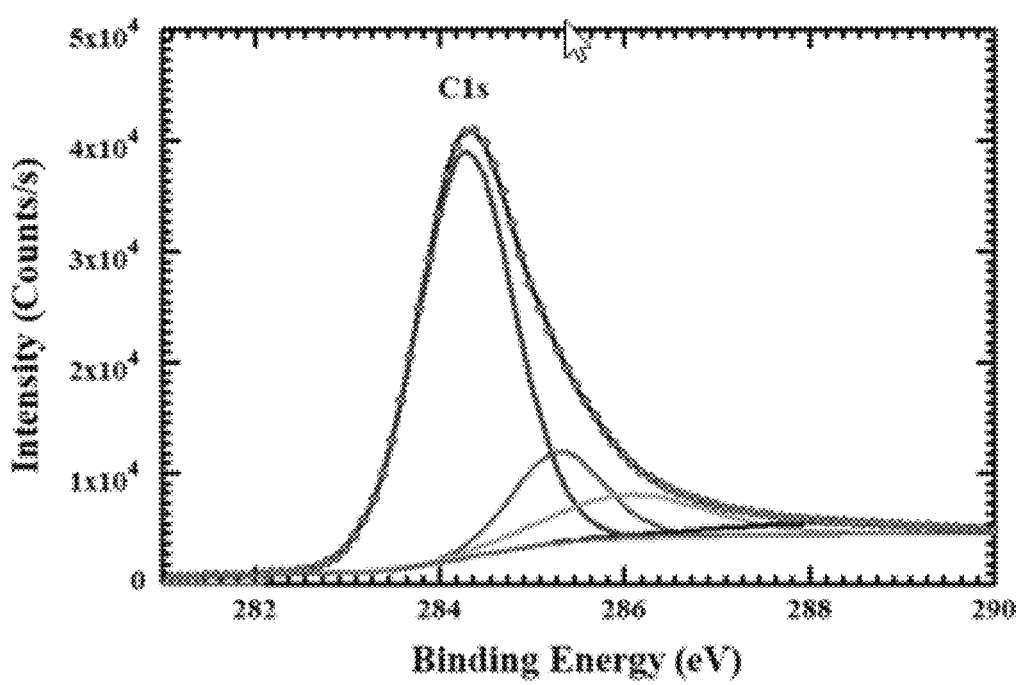
FIG. 6B shows XPS of NaNC (C 1s) deconvoluted.
Figure 6C:
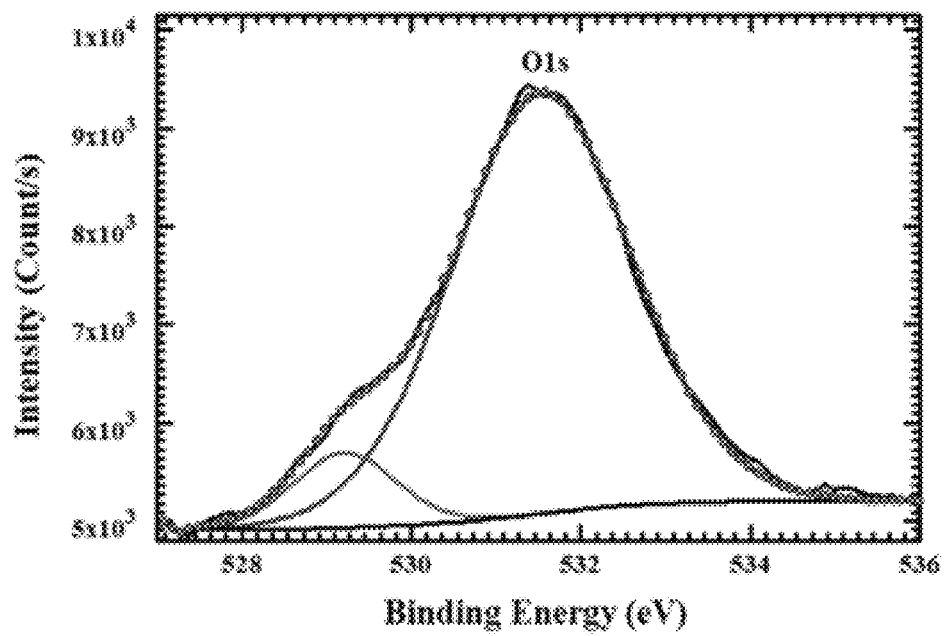
FIG. 6C shows XPS of NaNC (O 1s) deconvoluted.
Figure 6D:
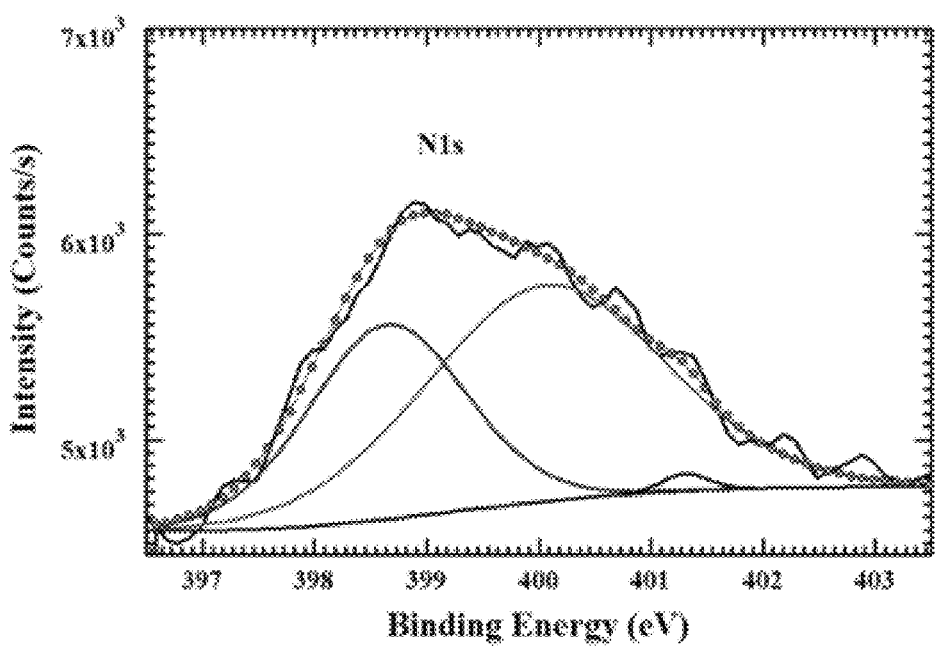
FIG. 6D shows XPS of NaNC (N 1s) deconvoluted.

FIG. 6B shows the XPS spectra for C 1s. Deconvolution of the C 1s spectrum shows four distinct peaks with binding energies at 284.6, 285.6, 286.3, and 288.4 eV (see FIG. 6B) related to $sp^2$ C—C and C=C graphitic carbon, C—O phenol or alcohol bonding, C—N linkage, and ester linkages, respectively [Goel et al. "Synthesis of nitrogen doped mesoporous carbons for carbon dioxide capture" *RSC Advances*. 2015, 5, 46568-46582—incorporated herein by reference in its entirety]. Deconvoluted O 1 s spectrum shown in FIG. 6C displays the binding energies related to C=O groups at 529.2 eV and C—O—C or C—OH groups at 531.8 eV [Biniak et al. "The characterization of activated carbons with oxygen and nitrogen surface groups" *Carbon* (1997) 35, 1799-1810—incorporated herein by reference in its entirety]. FIG. 6D shows the three deconvoluted peaks of N 1s centered at 398.6, 400.1, and 401.3 eV, which can be attributed to pyridinic, pyrrolic and/or pyridonic nitrogen (Goel et al.).

Figure 7:
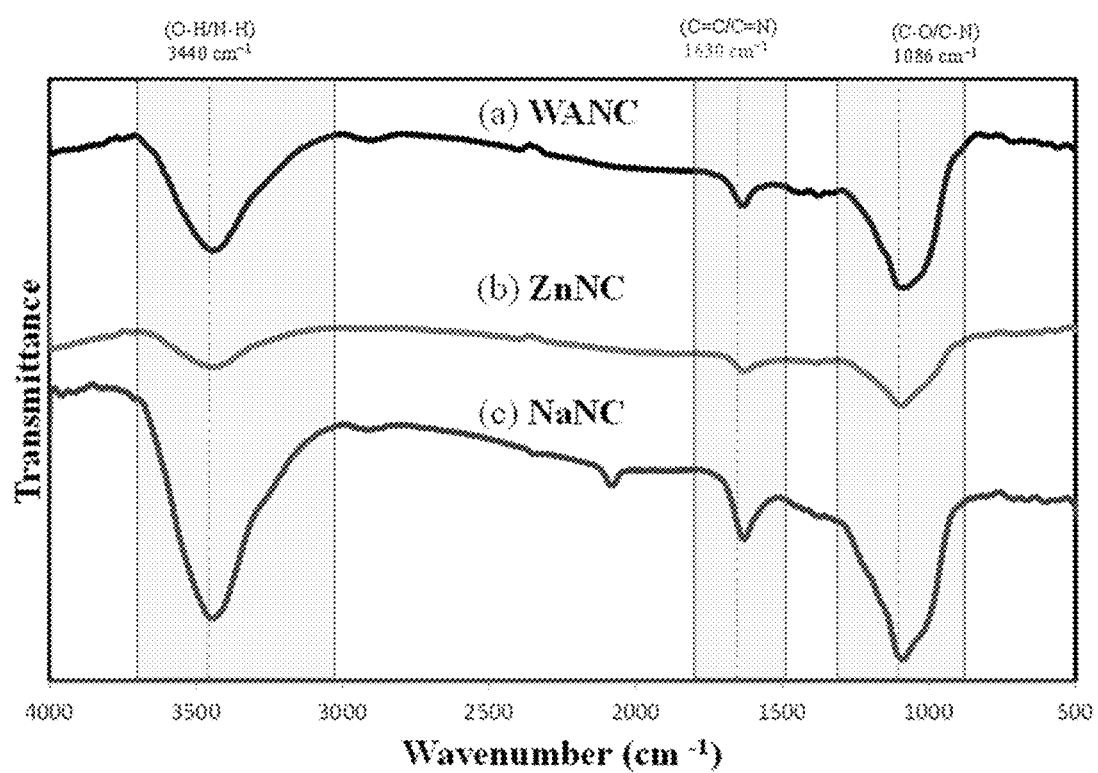
FIG. 7 shows Fourier transform infrared spectra of: (a) WANC (b) ZnNC and (c) NaNC activated carbons.

FIG. 7 shows the FTIR spectra of the activated carbon samples, WANC, ZnNC, and NaNC. All spectra show similar vibration bands characteristic of activated carbon materials [Hesas et al. "Preparation and characterization of activated carbon from apple waste by microwave-assisted phosphoric acid activation: application in methylene blue adsorption" *BioResources*. (2013) 8, 2950-2966-incorporated herein by reference in its entirety]. The FTIR spectra of all samples show absorption in the region 3500-3000 $cm^{-1}$ corresponding to hydroxyl structures [Larkin, P. "General outline and strategies for IR and Raman spectral interpretation. IR and Raman Spectroscopy: Principles and Spectral Interpretation" (2011) 117-134—incorporated herein by reference in its entirety. The broad absorption band with a peak at ca. 3430 $cm^{-1}$ is attributed to the O—H stretching vibration of hydroxyl groups and adsorbed water. Also, the peak 3100-3500 $cm^{-1}$ can be attributed to N—H stretching vibration. Noticeably, ZnNC shows a sign of a reduction in hydrogen bonding, as reflected by the small O—H stretching band at ca. 3430 $cm^{-1}$. The band observed between ca. 1750 and 1500 $cm^{-1}$ and centered ca. 1630 $cm^{-1}$ corresponds to olefinic group (C=C, 1850-1500 $cm^{-1}$)/(C=N) [Huang et al. "Highly efficient magnetic nitrogen-doped porous carbon prepared by one-step carbonization strategy for $Hg^{2+}$ removal from water" *ACS applied materials & interfaces*. 2017, 9, 2550-2559, and Clougherty et al. "C=N stretching frequency in infrared spectra of aromatic azomethine". *The Journal of Organic Chemistry*. 1957, 22, 462—each incorporated herein by reference in its entirety]. The intense absorption band centered at ca. 1086 $cm^{-1}$ can be assigned to C—O stretching (C—O, 850-1300 $cm^{-1}$) or C—N stretching (1080-1360 $cm^{-1}$), see Larkin, P. The small broad band observed between 3000-2800 $cm^{-1}$ in the spectra of WANC and NaNC can be attributed to the adsorption of an aliphatic group (C—H). The band appearing in the NaNC spectrum at ca. 2082 cm$^{-1}$ can be attributed to a carbon-carbon triple bond (—C≡C—), triple and cumulated double bond stretch usually appears as a weak band from 2260-2100 cm$^{-1}$, see Larkin P. Overall, it is very difficult to differentiate the oxygen and nitrogen containing functional groups in the synthesized carbon samples by FTIR as the peaks overlap. This phenomenon was realized in the reported FTIR spectra of graphene oxide and N-doped graphene oxide [Kumar et al. "Plasma-assisted simultaneous reduction and nitrogen doping of graphene oxide nanosheets" *Journal of Materials Chemistry A*. 2013, 1, 4431-4435—incorporated herein by reference in its entirety].

Example 7

Electrochemistry
Preparation of Working Electrodes:

Twenty milligrams of each of the prepared carbon samples was mixed separately with 5 mL of ethanol, sonicated for 1 h, then mixed with 30 μL of Nafion, which was used as a binding material, and finally sonicated for another 30 min. On a steel foil (2 cm×1 cm), 300 μL of the solutions was dropped and the ethanol was evaporated to obtain the working electrodes. Finally, the electrodes were dried at 60° C. for 2 h.

Electrochemical Measurements:

Electrochemical measurements were performed using a CHI 760E potentiostat in a three-electrode configuration comprising a counter electrode (platinum foil), a working electrode coated with nitrogen doped carbon, and a standard reference electrode (Ag/AgCl). A solution of 1 M $H_2SO_4$ was utilized as the aqueous electrolyte for the cell. Cyclic voltammetry (CV) measurements at different scanning rates were conducted. Galvanostatic charge-discharge (GCD) measurements were performed at different current densities for the three samples to examine their capacity and test their stability over thousands of cycles. The specific capacitance was calculated using formulas 1 and 2 for CV and GCD, respectively [Zhu et al. "Effects of various binders on supercapacitor performances" *Int J Electrochem Sci* (2016) 11, 8270-8279—incorporated herein by reference in its entirety].

$$C = \int IdV / mv\Delta V \quad (1)$$

$$C = I\Delta t / m\Delta V \quad (2)$$

where C is the specific capacitance (F g$^{-1}$), I is the applied current density (A g$^{-1}$), Δt is the time required for discharging (s), m is the carbon mass loaded on the electrode (g), ΔV is the voltage range for charging and discharging (V), and v is the potential scan rate (V/s).

Figure 8A:
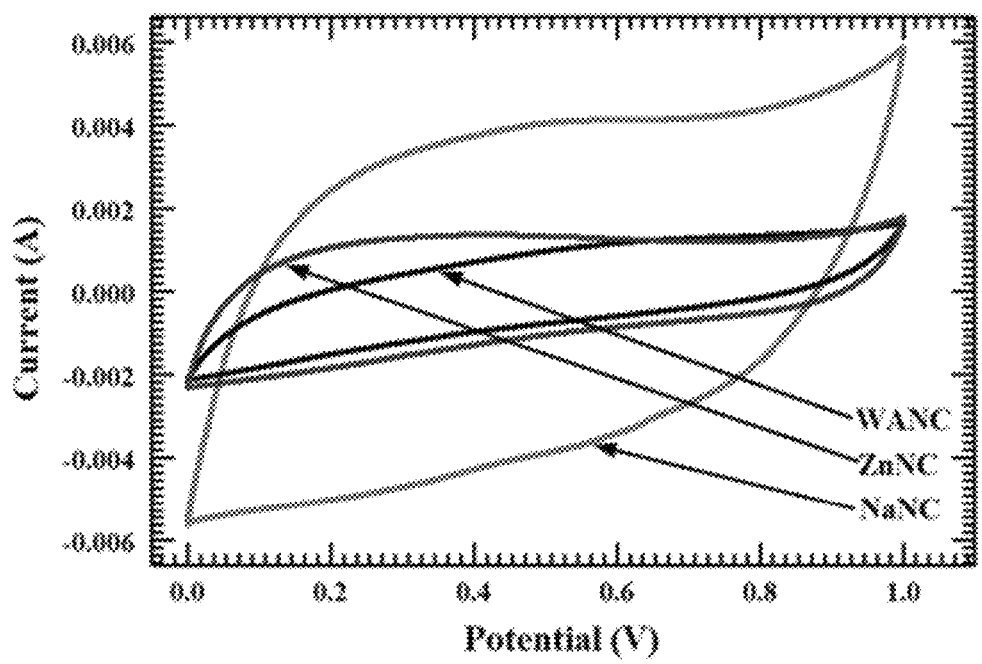
FIG. 8A shows CV curves obtained at scanning rate of 20 mV/s of electrodes coated with WANC, ZnNC, and NaNC.
Figure 8B:
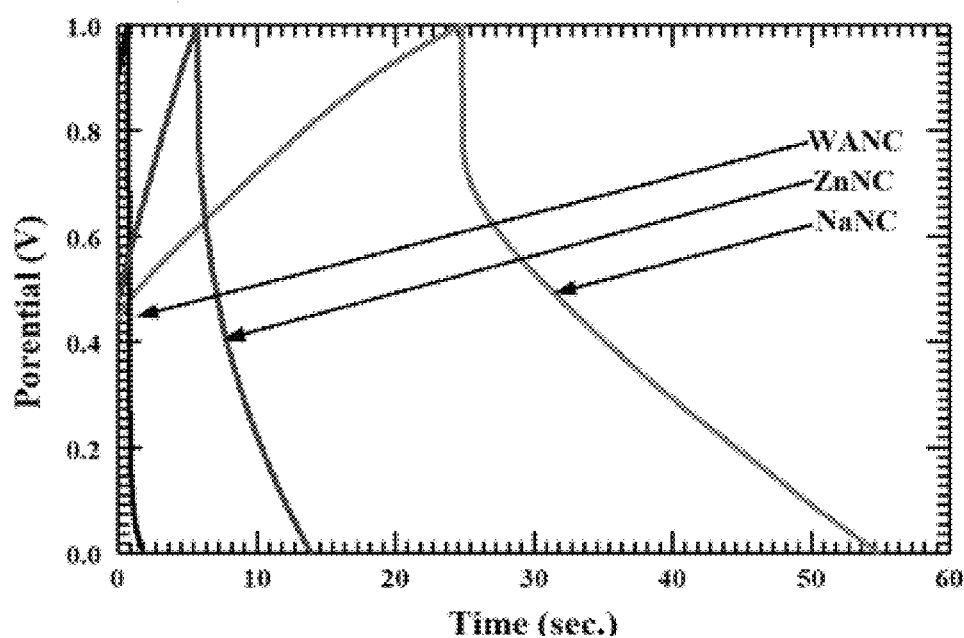
FIG. 8B shows GCD curves obtained at current density of 2 A/g of an electrode coated with WANC, ZnNC, and NaNC.
Figure 9A:
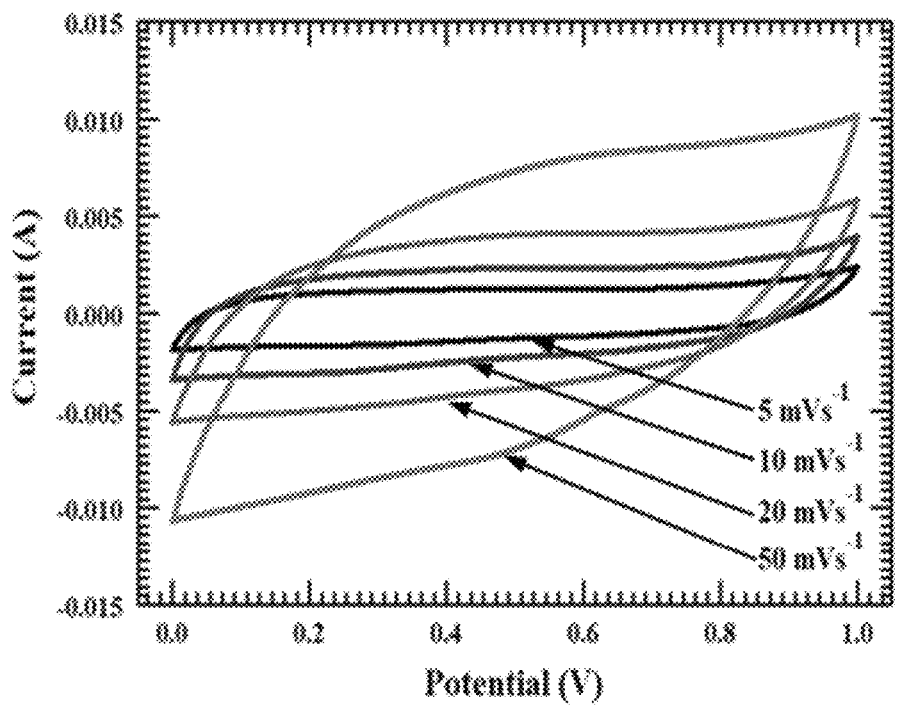
FIG. 9A shows CV curves for NaNC electrode at scan rates of 5, 10, 20, and 50 mV s$^{-1}$.

Cyclic voltammetry (CV) and galvanostatic charge-discharge (GCD) measurements were performed with the three carbon electrodes to study their supercapacitance performance. FIGS. 8A and 8B compare the performances of each of the three prepared samples. The CV curves shown in FIG. 8A of WANC, ZnNC, and NaNC have a nearly rectangle-like shape exhibiting typical EDLC mechanism [Wang et al. "Three-dimensional flower-like and hierarchical porous carbon materials as high-rate performance electrodes for supercapacitors" *Carbon*. (2014) 67, 119-127; Tang et al. "A high energy density asymmetric supercapacitor from nano-architectured Ni(OH)$_2$/Carbon nanotube electrodes" *Advanced Functional Materials* (2012) 22, 1272-1278; and Karthikeyan et al. "A novel asymmetric hybrid supercapacitor based on Li$_2$FeSiO$_4$ and activated carbon electrodes" *Journal of Alloys and Compounds* (2010) 504, 224-227—each incorporated herein by reference in their entirety]. In addition, the NaNC electrode shows two small broad peaks near 0.3 and 0.6 V, implying Faradaic redox reactions or pseudocapacitive behavior due to the presence of oxygen- and nitrogen-containing functional groups in NaNC. As mentioned previously, the main purpose of the activation process is to increase the specific surface area of the carbon electrode, which has a significant role in boosting the specific capacity of the double layer capacitance of the electrode. As expected, WANC and ZnNC, which have a lower specific surface area compared to NaNC, exhibit smaller specific capacitances of 35.9 F g$^{-1}$ and 53.4 F g$^{-1}$, respectively, at a 20 mV/s scan rate. In contrast, NaNC shows specific capacitance of 160.2 F g$^{-1}$. Similar behavior was observed in the charging-discharging measurements, as shown in FIG. 8B. NaNC has the highest discharging rate and hence, the largest specific capacitance. At 2 A g$^{-1}$, NaNC has a specific capacitance value of 214.5 F g$^{-1}$, whereas WANC and ZnNC have specific capacitance of 19.1 F g$^{-1}$ and 30.3 F g$^{-1}$, respectively. In addition to the high specific surface area, the large capacitance value of NaNC could be attributed to its good conductivity due to the oxygen- and nitrogen-containing functional groups of the activated carbon [Suktha et al. "High-performance supercapacitor of functionalized carbon fiber paper with high surface ionic and bulk electronic conductivity: effect of organic functional groups" *Electrochimica Acta* (2015) 176, 504-513; and Cheng et al. "Synergistic effects from graphene and carbon nanotubes enable flexible and robust electrodes for high-performance supercapacitors" *Nano letters*. 2012, 12, 4206-4211—each incorporated herein by reference in their entirety]. NaHCO$_3$-activated carbon was further investigated at different scan rates and different current densities. FIG. 9A displays the CV measurements of NaNC at scan rates of 5, 10, 20, and 50 mV s$^{-1}$. The specific capacitances were 225.8 F g$^{-1}$, 198.6 F g$^{-1}$, and 160.2 F g$^{-1}$ at scan rates of 5, 10 and 20 mV s$^{-1}$, respectively. At scan rate of 50 mV s$^{-1}$, the CV curve shows a distorted rectangular shape, but it has a specific capacitance of 104.8 F g$^{-1}$, indicating good capacitance performance even at high scanning rates.

Figure 9B:
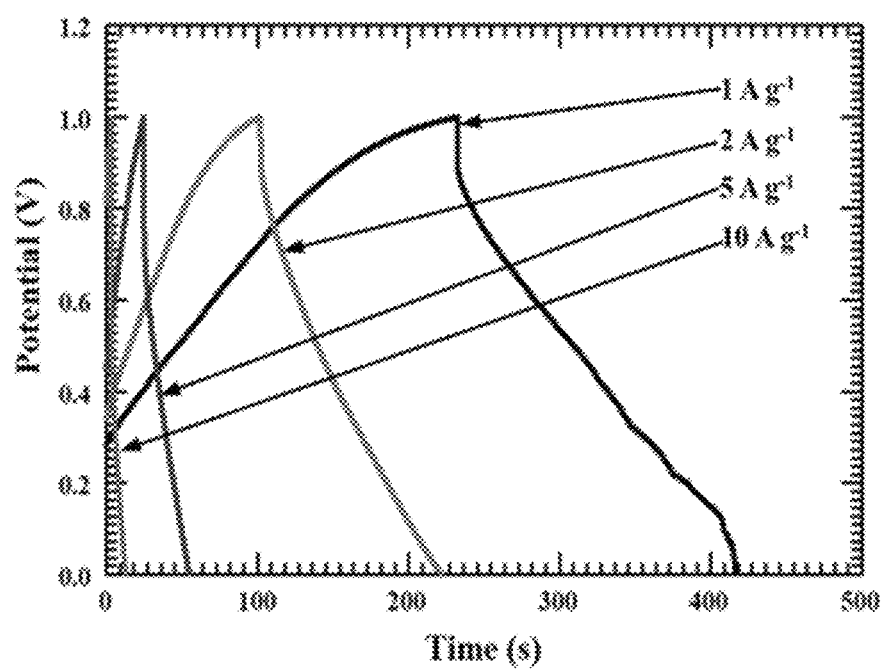
FIG. 9B shows GCD curves at current densities of 1, 2, 5, and 10 A/g of an electrode coated with NaNC.
Figure 9C:
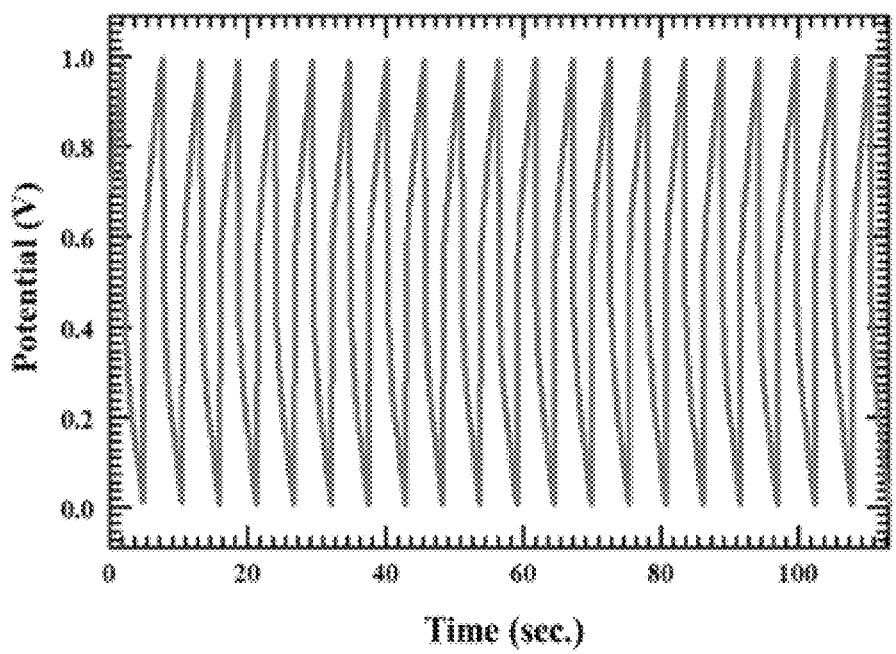
FIG. 9C shows 20 GCD cycles of NaNC activated carbon electrode at current densities of 20 A/g.
Figure 9D:
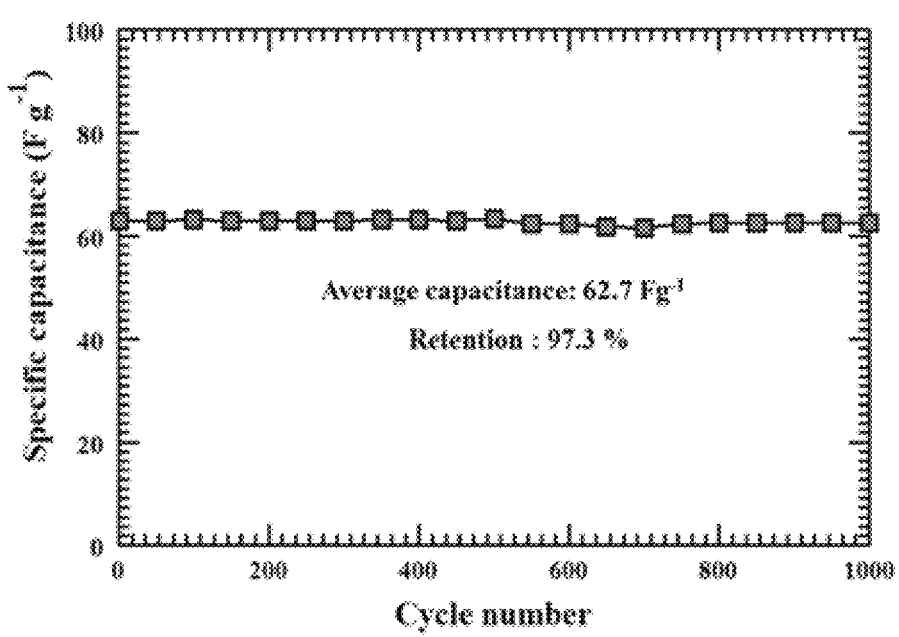
FIG. 9D shows capacitance retention of NaNC activated carbon electrode at current densities of 20 A/g.

GCD curves of NaNC were obtained to examine the electrochemical performance of the capacitor at different applied current densities, as shown in FIG. 9B. Curves show a quasi-triangular shape, revealing ideal EDLC behavior [Yang et al. "All solid-state electric double-layer capacitors based on alkaline polyvinyl alcohol polymer electrolytes" *Journal of power sources* (2005) 152, 303-310—incorporated herein by reference in its entirety]. A specific capacitance of 231.2 F g$^{-1}$ was achieved at an applied current density of 1 A g$^{-1}$. By increasing the value of the applied current density to 2 A g$^{-1}$, 5 A g$^{-1}$, and 10 A g$^{-1}$, the specific capacitance decreased to 214.5 F g$^{-1}$, 166.7 F g$^{-1}$, and 108.8 F g$^{-1}$, respectively. The decreasing trend in the specific capacitance with increasing applied current density is attributed to insufficient electrolyte ion diffusion on the carbon electrode surface at higher current densities [Mondal et al. "Nitrogen-Doped Porous Carbon Nanosheets from Eco-Friendly *Eucalyptus* Leaves as High Performance Electrode Materials for Supercapacitors and Lithium Ion Batteries" *Chemistry A European Journal*. (2017) 23, 3683-3690—incorporated herein by reference in its entirety]. FIG. 9C demonstrates the first 20 charging-discharging cycles of 1000 cycles for NaNC. The cycles have similar curves, indicating stability and excellent electrochemical performance. FIG. 9D shows 97.3% retention of specific capacitance even after 1000 charging-discharging cycles, confirming the high stability of the NaNC electrode. Table 2 summarizes the specific capacitances of the three carbon electrodes, WANC, ZnNC, and NaNC. Table 3 compares the specific capacitance of NaNC (231.2 F g$^{-1}$) to those previously reported carbon electrodes prepared from different biomass feedstocks.

TABLE 2

Specific capacitance of the three carbon electrodes, WANC, ZnNC, and NaNC

| Electrode | CV Measurement at Scanning rate of 20 mV/s F/g | GDC at Current Density of 2 A/g F/g |
|---|---|---|
| WANC | 35.9 | 19.1 |
| ZnNC | 53.4 | 30.3 |
| NaNC | 160.2 | 214.5 |

Specific capacitance of NaNC Electrode Measured by CV

| Scanning rate | 5 mV/s | 10 mV/s | 20 mV/s | 50 mV/s |
|---|---|---|---|---|
| F/g | 225.8 F g$^{-1}$ | 198.6 F g$^{-1}$ | 160.2 F g$^{-1}$ | 104.8 F g$^{-1}$ |

Specific capacitance of NaNC Electrode Measured by GDC

| Current density, A/g | 1 | 2 | 5 | 10 |
|---|---|---|---|---|
| F/g | 231.2 | 214.5 | 166.7 | 108.8 |

TABLE 3

Comparison of the specific capacitance of NaNC with that of previously reported carbon prepared from different biomasses

| Biomass waste (carbon source) | Activating agent | Surface area (m$^2$/g) | Specific capacitance (F/g) | Measurement conditions | Ref |
|---|---|---|---|---|---|
| Giant Miscanthus | KOH | 2212 | 121 | 1 M TEABF4, 0.5 mA/cm$^2$ | 1 |
| Coffee endocarp | CO$_2$ | 709 | 176 | 1 M H$_2$SO$_4$, 10 mA | 2 |
| Bamboo | KOH | >3000 | >300 | 1 M KOH, 1 A/g | 3 |
| Coconut shells | ZnCl$_2$ | 2440 | 246 | 0.5 M H$_2$SO$_4$, 0.25 A/g | 4 |
| Potato waste | ZnCl$_2$ | 1052 | 255 | 2 M KOH, 1 A/g | 5 |
| Rice straw | H$_3$PO$_4$ | 376.65 | 112 | 1 M H$_2$SO$_4$, 2 mV/s | 6 |
| Teak wood | ZnCl$_2$ | 2108 | 131 | 1 M LiPF$_6$, 0.1 A/g | 7 |
| Broad beans | KOH | 655.4 | 202 | 6 M KOH, 0.5 A/g | 8 |
| Banana fiber | ZnCl$_2$ | 1097 | 74 | 1 M Na$_2$SO$_4$, 0.5 A/g | 9 |
| A. procera | NaHCO$_3$ | 910 | 231 | 1 M H$_2$SO$_4$, 1 A/g | This work |

REFERENCES (1) Han et al. "Herbaceous Biomass Waste-Derived Activated Carbons for Supercapacitors" J. Electrochem. Sci. Technol. (2018) 9, 157-162.

(2) Nabais et al. "Development of easy made low cost bindless monolithic electrodes from biomass with controlled properties to be used as electrochemical capacitors" Biores. Technol. (2011) 102, 2781-2787.

(3) Yang et al. "Bamboo-based activated carbon for supercapacitor applications. Current Applied Physics" (2014) 14, 1616-1620.

(4) Jain et al. "Mesoporous activated carbons with enhanced porosity by optimal hydrothermal pre-treatment of biomass for supercapacitor applications" Micropor. Mesopor. Mat. (2015) 218, 55-61.

(5) Ma et al. "Nitrogen-doped porous carbon derived from biomass waste for high-performance supercapacitor" Bioreso. Technol. (2015), 197, 137-142.

(6) Adinaveen et al. "Surface and porous characterization of activated carbon prepared from pyrolysis of biomass (rice straw) by two-stage procedure and its applications in supercapacitor electrodes" J. Mat. Cycl. Waste Manag. (2015) 17, 736-747.

(7) Jain et al. "Highly mesoporous carbon from Teak wood sawdust as prospective electrode for the construction of high energy Li-ion capacitors" Electrochimica Acta (2017) 228, 131-138.

(8) Xu et al. "Biomass-derived porous carbon materials with sulfur and nitrogen dual-doping for energy storage" Green Chem. (2015) 17, 1668-1674.

(9) Subramanian et al. "Supercapacitors from activated carbon derived from banana fibers" J. Phys. Chem. (2007) 111, 7527-7531.

The invention claimed is:

1. A method of preparing nitrogen doped carbon nanosheets, comprising:
   mixing dried and pulverized *Albizia procera* leaves with an activator in a mass ratio in the range of 0.1-1.0 to form a mixture, and
   heating the mixture in an inert atmosphere at a temperature in the range 700-1,000° C. for 2-8 hours to form the nitrogen doped carbon nanosheets.

2. The method of claim 1, wherein the activator is at least one selected from the group consisting of carbon dioxide, an alkali metal hydroxide, a metal salt, and a mineral acid.

3. The method of claim 1, wherein the activator is at least one selected from the group consisting of potassium bicarbonate, sodium bicarbonate, potassium carbonate, sodium carbonate, zinc chloride, and calcium chloride.

4. The method of claim 1, wherein the activator is potassium bicarbonate or sodium bicarbonate.

5. The method of claim 4, wherein the weight ratio of pulverized *Albizia procera* leaves to the activator is in the range of 0.2-0.8.

6. The method of claim 1, wherein the temperature is in the range of 800-900° C.

7. The method of claim 1, wherein the inert atmosphere is nitrogen or argon.

8. Porous nitrogen doped carbon nanosheets obtained by the method of claim 1 having a BET surface area in the range of 300-1,500 m$^2$/g.

9. The porous nitrogen doped carbon nanosheets of claim 8 having an average pore diameter in the range of 10-50 Å.

10. A modified electrically conductive substrate coated with the nitrogen doped carbon nanosheets of claim 8.

11. The modified electrically conductive substrate of claim 10, wherein the carbon nanosheets are present on the surface of the substrate in an amount in the range of 0.2-10 mg/cm$^2$.

12. The modified electrically conductive substrate of claim 10, having a specific capacitance in the range of 175-300 F/g at an applied current density of 1 A/g in 1 M sulfuric acid electrolyte.

13. The modified electrically conductive substrate of claim 10, wherein the electrically conductive substrate is glassy carbon, graphite, gold, platinum, silver, iron, copper, aluminum, or an electrically conductive polymer.

14. The modified electrode of claim 13, wherein the electrically substrate is an electrically conductive polymer selected from the group consisting of a poly(p-phenylene vinylene), a poly(3-alkylthiophene), a polyacetylene, a poly(fluorine), a polypyrene, a polyazulene, a polynaphthalene, a polypyrole, a polyaniline, a polycarbazole, a polyazepine, a polyindole, a polythiophene, a poly(3,4-ethylenedioxythiophene), and a poly(p-phenylene sulfide).

15. A method of making the modified electrically conductive substrate of claim 10 comprising:
preparing a slurry of the porous nitrogen doped carbon nanosheets in a solvent containing tetrafluoroethylene-perfluoro-3,6-dioxa-4-methyl-7-octenesulfonic acid copolymer (Nafion®) in an amount in the range of 0.001 wt. % to 0.01 wt. %,
sonicating the slurry to form a suspension,
depositing the suspension on the surface of an electrically conductive substrate,
drying the deposited suspension on the electrically conductive substrate surface, and
repeating the depositing and drying steps until a catalyst loading of 0.2-10 mg/cm$^2$.

16. The method of claim 15, wherein the electrically conductive substrate is glassy carbon, graphite, gold, platinum, silver, iron, copper, aluminum or an electrically conductive polymer.

17. The modified electrode of claim 16, wherein the electrically substrate is an electrically conductive polymer selected from the group consisting of a poly(p-phenylene vinylene), a poly(3-alkylthiophene), a polyacetylene, a poly(fluorine), a polypyrene, a polyazulene, a polynaphthalene, a polypyrole, a polyaniline, a polycarbazole, a polyazepine, a polyindole, a polythiophene, a poly(3,4-ethylenedioxythiophene), and a poly(p-phenylene sulfide).

18. An electrochemical cell comprising at least one electrode which is the modified electrically conductive substrate of claim 10.

19. The electrochemical cell of claim 18, wherein the electrolyte is an aqueous alkali metal hydroxide or a mineral acid at a concentration in the range of 0.1 to 2.0 M.

20. A supercapacitor comprising at least one electrode which is the modified electrically conductive substrate of claim 10.

* * * * *